United States Patent
Nguyen et al.

(10) Patent No.: US 10,789,261 B1
(45) Date of Patent: Sep. 29, 2020

(54) VISUAL DISTRIBUTED DATA FRAMEWORK FOR ANALYSIS AND VISUALIZATION OF DATASETS

(71) Applicant: Arimo, Inc., Mountain View, CA (US)

(72) Inventors: Christopher Nguyen, Los Altos, CA (US); Anh H. Trinh, Mountain View, CA (US); Bao Nguyen, Mountain View, CA (US); Selene Chew, Mountain View, CA (US)

(73) Assignee: ARIMO, LLC, Mountain View, CA (US)

( * ) Notice: Subject to any disclaimer, the term of this patent is extended or adjusted under 35 U.S.C. 154(b) by 510 days.

(21) Appl. No.: 15/465,531

(22) Filed: Mar. 21, 2017

Related U.S. Application Data

(60) Provisional application No. 62/314,381, filed on Mar. 28, 2016.

(51) Int. Cl.
  *G06F 16/248* (2019.01)
  *G06F 16/80* (2019.01)
  *G06F 16/28* (2019.01)
  *G06F 16/2453* (2019.01)

(52) U.S. Cl.
  CPC ...... *G06F 16/248* (2019.01); *G06F 16/24544* (2019.01); *G06F 16/282* (2019.01); *G06F 16/80* (2019.01)

(58) Field of Classification Search
  None
  See application file for complete search history.

(56) References Cited

U.S. PATENT DOCUMENTS

| | | | |
|---|---|---|---|
| 7,702,152 B2 * | 4/2010 | Park | G06K 9/00711 382/170 |
| 9,336,267 B2 * | 5/2016 | Ting | G06F 16/248 |
| 9,905,034 B2 * | 2/2018 | Prophete | G06F 16/26 |
| 2006/0013481 A1 * | 1/2006 | Park | G06F 16/5854 382/170 |
| 2007/0130113 A1 * | 6/2007 | Ting | G06F 16/2423 |
| 2017/0083589 A1 * | 3/2017 | Pominville | G06F 16/2228 |
| 2017/0300840 A1 * | 10/2017 | Rainey | G06F 16/29 |

* cited by examiner

*Primary Examiner* — Kim T Nguyen
(74) *Attorney, Agent, or Firm* — Fenwick & West LLP

(57) ABSTRACT

A system represents data as visual distributed data frames (VDDFs) that comprise a dataset, metadata describing the data, and metadata describing visualization of the dataset. A VDDF may be extracted from charts displayed in markup language documents. A VDDF may be generated from different data sources including big data analysis systems. A VDDF workspace allows interaction with multiple VDDF objects extracted from multiple data sources and stored locally within the storage of the device. The VDDF workspace allows the user to interact with the VDDF objects, for example, by inspecting the metadata, modifying the data, adding new columns, changing the visualization, joining data from multiple charts, and sharing the VDDF objects with other documents. The processing of data of a VDDF is performed locally within a computing device, for example, in a client device.

20 Claims, 25 Drawing Sheets

VISUAL DISTRIBUTED DATA FRAMEWORK FOR ANALYSIS AND VISUALIZATION OF DATASETS

CROSS REFERENCE TO RELATED APPLICATION

This application claims the benefit of U.S. Provisional Application No. 62/314,381, filed on Mar. 28, 2016, which is incorporated by reference in its entirety.

FIELD OF ART

The disclosure relates querying and analyzing datasets in general and in particular to storing and querying data represented as charts in documents, for example, markup language documents.

DESCRIPTION OF THE RELATED ART

Enterprises produce large amount of data based on their daily activities. This data is stored in a distributed fashion among a large number of computer systems. For example, large amount of information is stored as logs of various systems of the enterprise. Typically, this information may be available in different formats as unstructured as well as structured data. The representation of the data stored in these systems is often complex. Therefore, users such as analysts prepare charts that show a visual representation of the data in a simplified format that is easy to understand. For example, several websites present data as charts embedded within documents. A user may retrieve these documents via a browser application. However, these charts are typically static charts that do not allow users to interact with the chart. Users would like to be able tom interact with the charts to perform analysis that is not presented by the charts themselves. However conventional techniques do not allow users to modify the charts or to perform analysis that is different from the analysis presented by the static chart.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 18:
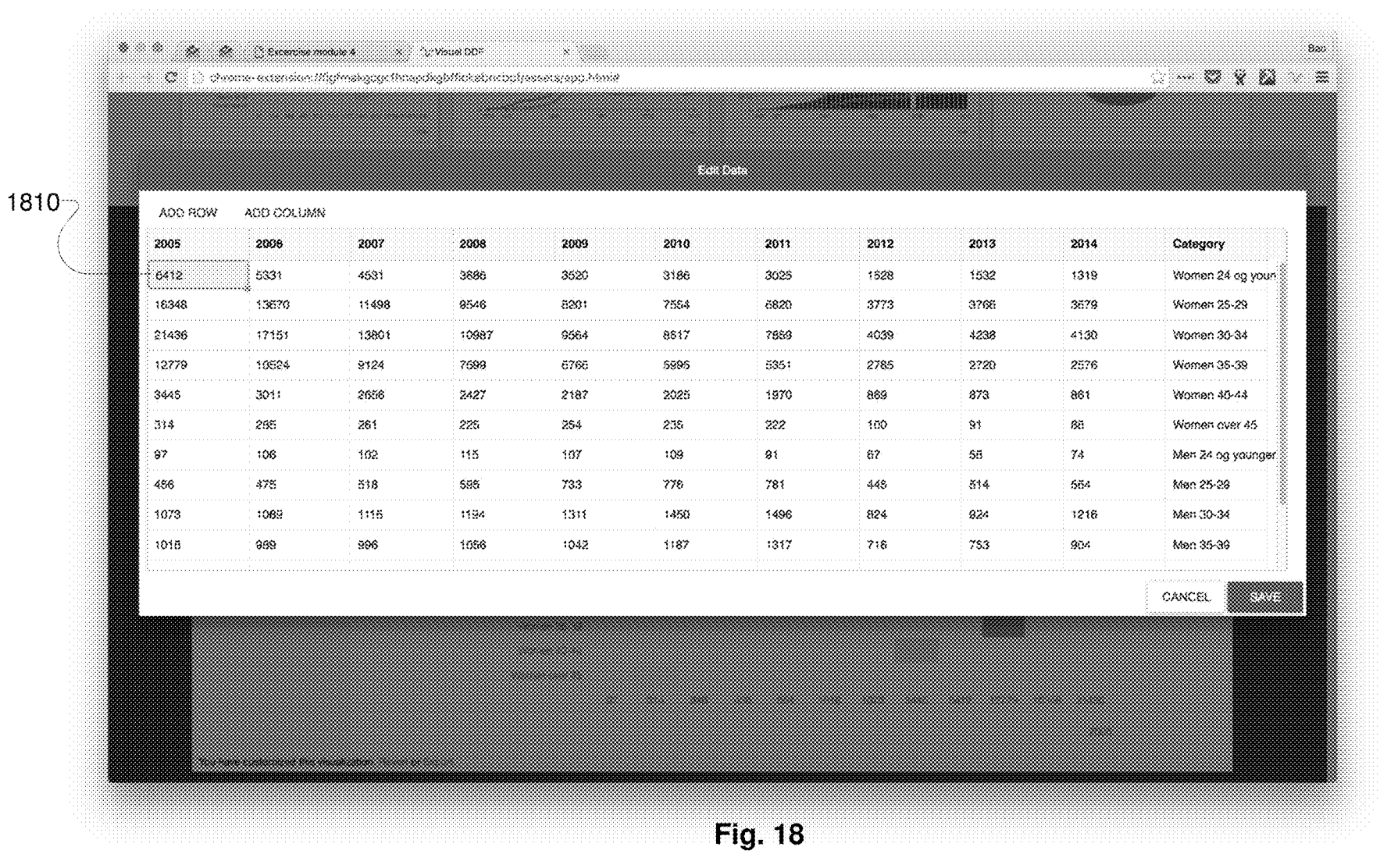

FIG. 18 shows a screen shot of a user interface for editing data of the dataset of a VDDF, according to an embodiment.

Figure 22:
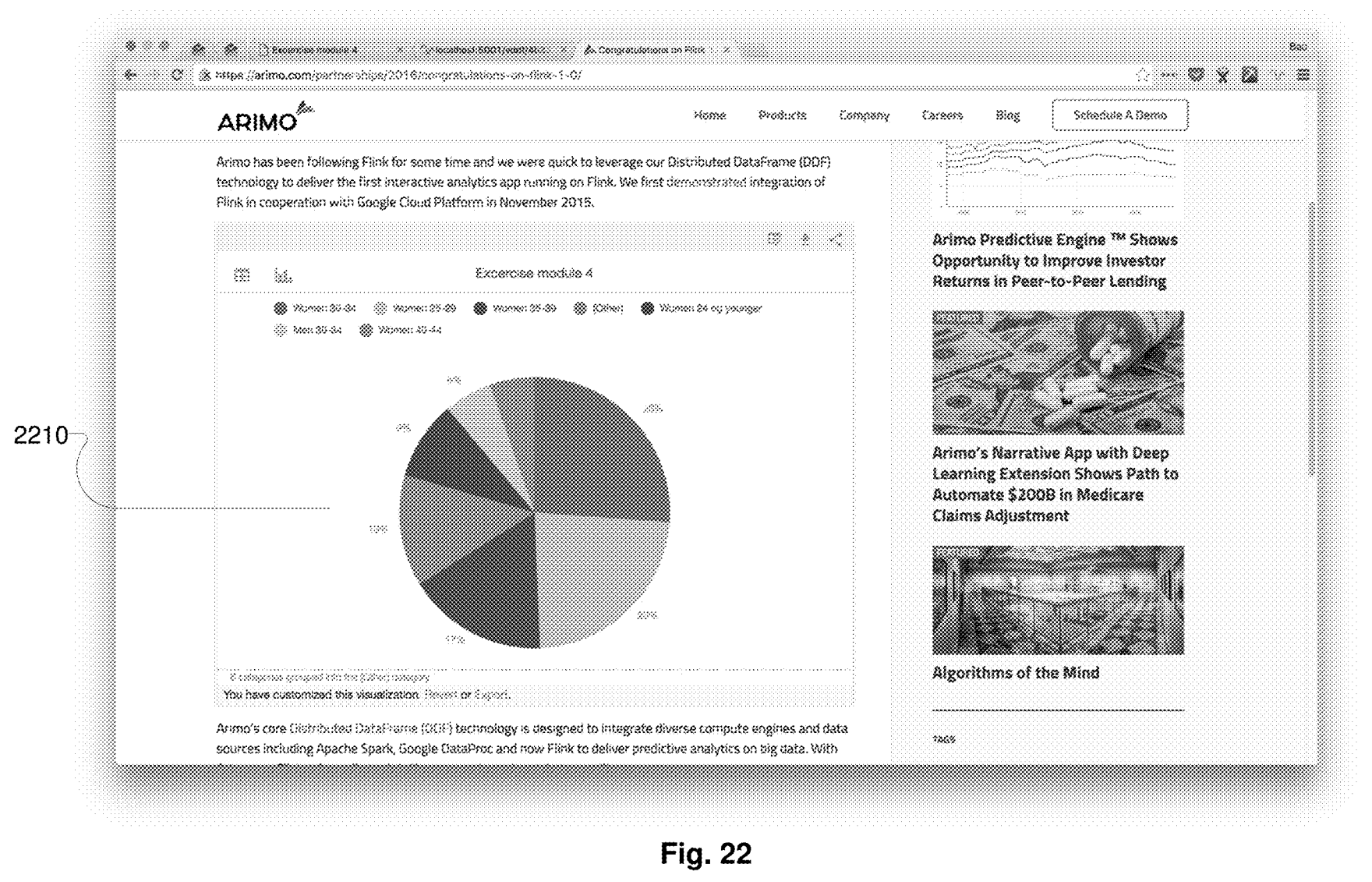

FIG. 22 shows a screen shot of a user interface illustrating modification of a chart type of a VDDF embedded in a document, according to an embodiment.

Figure 1:
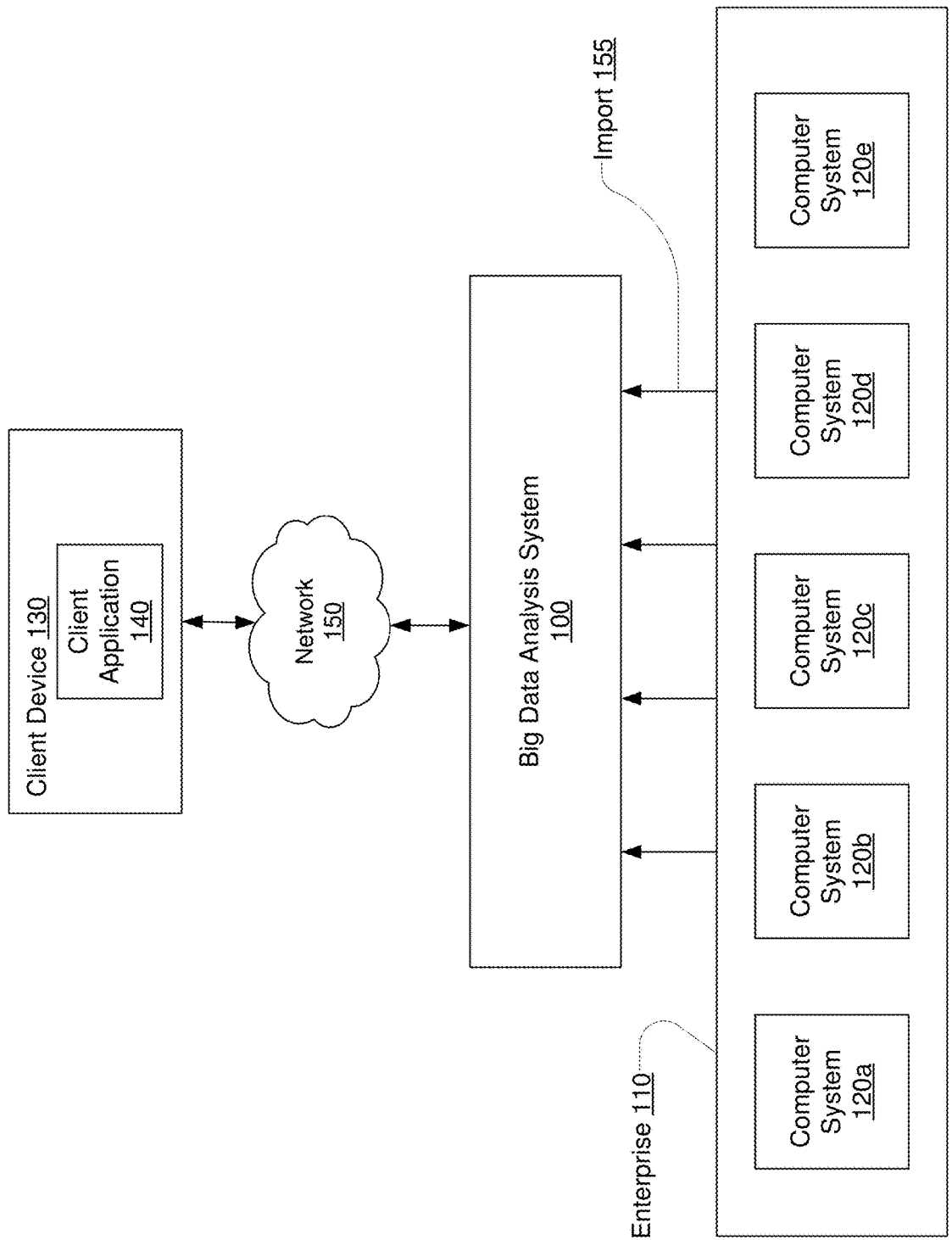
FIG. 1 shows the overall system environment for performing analysis of big data, in accordance with an embodiment of the invention.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

A data analysis system allows users to perform analysis of data sets, for example, data generated by an enterprise. In an embodiment, the data analysis system is a big data analysis system that performs analysis of big data. Enterprises typically generate large amount of data via various mechanisms, for example, logs of various applications and operating systems executing on computers of the enterprise, data manually entered by operators, data received from third party applications, vendors and so on. Often data generated by large enterprises or by large distributed systems is so large and complex that traditional data processing applications such as traditional databases, spreadsheet applications, and so on are inadequate for processing the data. The capacities of conventional data processing systems keep increasing every year. Accordingly, the data that is considered big data at some point in time may not be big data at a later point in time. As a result, the threshold size of data that qualifies the data as big data is a moving target.

Data typically considered big data has one or more of the following characteristics. The volume (or size) of the data is typically very large (above a threshold value). The dataset includes a variety of data, for example, a mix of structured and unstructured data and/or a mix of data having different structures, format, and so on. The data is typically generated on a regular basis, for example, data is constantly produced by systems of an enterprise. Data is complex and typically generated by multiple sources and needs to be linked and correlated in order to process the information.

Data analyzed from such complex system is often presented as charts via a browser application. The charts may be presented via a markup language document, for example, an HTML document. The markup language documents presented by a browser application typically do not allow user interactions with the document. Embodiments allow users to perform various interactions with the charts of the markup language document including modifying the data underlying the charts, filtering the data, changing the chart types, and exporting as well as sharing the charts.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

FIG. 1 shows the overall system environment for performing analysis of big data, in accordance with an embodiment of the invention. The overall system environment includes an enterprise 110, a big data analysis system 100, a network 150 and client devices 130. Other embodiments can use more or less or different systems than those illustrated in FIG. 1. Functions of various modules and systems described herein can be implemented by other modules and/or systems than those described herein. Although the system described herein performs analysis of big data, the embodiments described herein are applicable to any kind of data analysis.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

The enterprise 110 is any business or organization that uses computer systems for processing its data. Enterprises 110 are typically associated with a business activity, for example, sale of certain products or services but can be any organization or groups of organizations that generates significant amount of data. The enterprise 110 includes several computer systems 120 for processing information of the enterprise. For example, a business may use computer systems for performing various tasks related to the products or services offered by the business. These tasks include sales transactions, inventory management, employee activities, workflow coordination, information technology management, and so on.

Performing these tasks generates large amount of data for the enterprise. For example, an enterprise may perform thousands of transactions daily. Different types of information is generated for each transaction including information describing the product/services involved in the transaction, errors/warning generated by the system during transactions, information describing involvement of personnel from the enterprise, for example, sales representative, technical support, and so on. This information accumulates over days, weeks, months, and years, resulting in large amount of data.

As an example of an enterprise, an airline may process data of hundreds of thousands of passengers traveling every day and large numbers of flights carrying passengers every day. The information describing the flights and passengers of each flight over few years can be several terabytes of data. Other enterprises that process petabytes of data are not uncommon. Similarly, search engines may store information describing millions of searches performed by users on a daily basis that can generate terabytes of data in a short time interval. As another example, social networking systems can have hundreds of millions of users. These users interact daily with the social networking system generating petabytes of data.

The big data analysis system 100 allows analysis of the large amount of data generated by the enterprise. The big data analysis system 100 may include a large number of processors for analyzing the data of the enterprise 110. In some embodiments, the big data analysis system 100 is part of the enterprise 110 and utilizes computer systems 120 of the enterprise 110. Data from the computer systems 120 of enterprise 110 that generate the data is imported 155 into the computer systems that perform the big data analysis.

The client devices 130 are used by users of the big data analysis system 100 to perform the analysis and study of data obtained from the enterprise 110. The users of the client devices 130 include data analysts, data engineers, and business experts. In an embodiment, the client device 130 executes a client application 140 that allows users to interact with the big data analysis system 100. For example, the client application 140 executing on the client device 130 may be an internet browser that interacts with web servers of the big data analysis system 100.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130 and the big data analysis system 100 are typically performed via a network 150, for example, via the internet. The interactions between the big data analysis system 100 and the computer systems 120 of the enterprise 110 are also typically performed via a network 150. In one embodiment, the network uses standard communications technologies and/or protocols. In another embodiment, the various entities interacting with each other, for example, the big data analysis system 100, the client devices 130, and the computer systems 120 can use custom and/or dedicated data communications technologies instead of, or in addition to, the ones described above. Depending upon the embodiment, the network can also include links to other networks such as the Internet.

System Architecture

Figure 2:
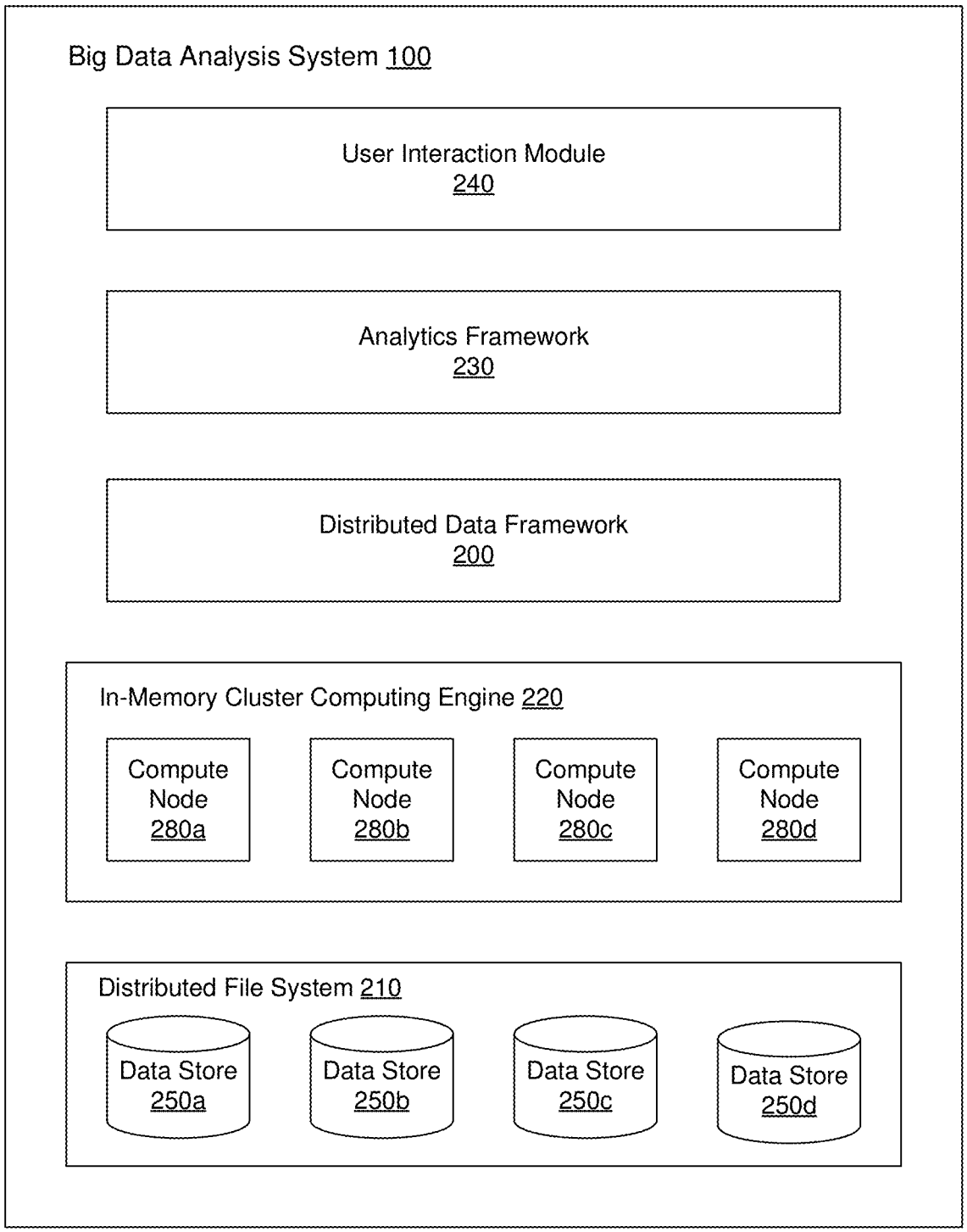
FIG. 2 shows the system architecture of a big data analysis system, in accordance with an embodiment.

FIG. 2 shows the system architecture of a big data analysis system, in accordance with an embodiment. A big data analysis system 100 comprises a distributed file system 210, an in-memory cluster computing engine 220, a distributed data framework 200, an analytics framework 230, and a user interaction module 240. The big data analysis system 100 may include additional or less modules than those shown in FIG. 2. Furthermore, specific functionality may be implemented by modules other than those described herein.

The distributed file system 210 includes multiple data stores 250. These data stores 250 may execute on different computers. In an embodiment, the distributed file system 210 stores large data files that may store gigabytes or terabytes of data. The data files may be distributed across multiple computer systems. In an embodiment, the distributed file system 210 replicates the data for high availability. Typically, the distributed file system 210 processes immutable files to which writes are not performed. An example of a distributed file system is HADOOP distributed file system (HDFS).

The in-memory cluster computing engine 220 loads data from the distributed file system 210 into a cluster of compute nodes 280. Each compute node 280 includes one or more processors and memory for storing data. The in-memory cluster computing engine 220 stores data in-memory for fast access and fast processing. For example, the distributed data framework 200 may receive repeated queries for processing the same distributed data structure stored in the in-memory cluster computing engine 220. The distributed data framework 200 can process the queries efficiently by reusing the distributed data structure stored in the in-memory cluster computing engine 220 without having to load the data from the file system. An example of an in-memory cluster computing engine is the APACHE SPARK system.

The distributed data framework 200 provides an abstraction that allows the modules interacting with the distributed data framework 200 to treat the underlying data provided by the distributed file system 210 or the in-memory cluster computing engine 220 as structured data comprising tables. The distributed data framework 200 supports an application programming interface (API) that allows a caller to treat the underlying data as tables. For example, a software module can interact with the distributed data framework 200 by invoking APIs supported by the distributed data framework 200.

Furthermore, the interface provided by the distributed data framework 200 is independent of the underlying system. In other words, the distributed data framework 200 may be provided using different implementations of in-memory cluster computing engines 220 (or different distributed file systems 210) that are provided by different vendors and support different types of interfaces. However, the interface provided by the distributed data framework 200 is the same for different underlying systems.

In an embodiment, the distributed data framework 200 provides a table based interface for interacting with the distributed data structures. The table based interface The table based structure allows users familiar with database technology to process data stored in the in-memory cluster computing engine 220. The table based distributed data structure provided by the distributed data framework is referred to as distributed data-frame (DDF). The data stored in the in-memory cluster computing engine 220 may be obtained from data files stored in the distributed file system 210, for example, log files generated by computer systems of an enterprise.

The distributed data framework 200 processes large amount of data using the in-memory cluster computing engine 220, for example, materialization and transformation of large distributed data structures. The distributed data framework 200 performs computations that generate smaller size data, for example, aggregation or summarization results and provides these results to a caller of the distributed data framework 200. The caller of the distributed data framework 200 is typically a machine that is not capable of handling large distributed data structures. For example, a client device 130 may receive the smaller size data generated by the distributed data framework 200 and perform visualization of the data or presentation of data via different types of user interfaces. Accordingly the distributed data framework 200 hides the complexity of large distributed data structures and provides an interface that is based on manipulation of small data structures, for example, database tables.

In an embodiment, the distributed data framework 200 supports SQL (structured query language) queries, data table filtering, projections, group by, and join operations based on distributed data-frames. The distributed data framework 200 provides transparent handling of missing data, APIs for transformation of data, and APIs providing machine-learning features based on distributed data-frames. Examples disclosed herein may use SQL syntax for illustration. However, any other type of query language may be used instead of SQL. Accordingly, various clauses of the SQL statements may be replaced with corresponding clauses in the target query language. For example, a SELECT clause of SQL statement may be replaced by the corresponding clause that selects the attributes of a dataset, a WHERE clause of an SQL statement may be replaced by a corresponding clause that filters the records or rows of a dataset processed by a statement of the query language.

The analytics framework 230 supports higher level operations based on the table abstraction provided by the distributed data framework 200. For example, the analytics framework 230 supports collaboration using the distributed data structures represented within the in-memory cluster computing engine 220. The analytics framework 230 supports naming of distributed data structures to facilitate collaboration between users of the big data analysis system 100. In an embodiment, the analytics framework 230 maintains a table mapping user specified names to locations of data structures.

The analytics framework 230 allows computation of statistics describing data represented as a DDF, for example, mean, standard deviation, variance, count, minimum value, maximum value, and so on. The analytics framework 230 also determines multivariate statistics for a DDF including correlation and contingency tables. Furthermore, analytics framework 230 allows grouping of DDF data and merging of two or more DDFs.

The user interaction module 240 allows a user to interact with the big data analysis system using natural language queries. The user interaction module 240 may provide a user interface to a user via a web browser or via some custom client applications. The user interaction module 240 receives natural language queries provided by users. The user interaction module 240 analyzes the queries to generate an execution plan for the natural language query. The execution plan comprises API (application programming interface) calls to the analytics framework 230 and the distributed data framework 200. The user interaction module 240 executes the natural language queries to generate the requested data and provides the result to the user. The user interaction module 240 may present the results of execution of a natural language query as textual data or as a chart.

In an embodiment, the distributed data framework 200 creates data objects that encapsulate a dataset and information (or metadata) describing visualization of the dataset. These data objects are referred to herein as visual distributed data frames (VDDFs). A VDDF may include metadata that describes the dataset stored in the VDDF. The metadata describing the data includes a list of attributes and types of the attributes. The metadata describing the visualization of chart includes a type of chart that is presented, the attributes of the dataset that are visualized (if a subset of the attributes of the data set are visualized), information describing presentation of the chart (including color, shapes, length, and width of the chart and shapes within the chart, and so on), and so on.

The VDDF may include a query that determines a subset of the data that is visualized. The query may identify a subset of the attributes of the dataset and may filter the rows of the dataset by specifying an expression based on attributes of the dataset. Accordingly, rows of the dataset that satisfy the expression are included in the chart presented via the display. For example, if the filter expression evaluates to true if attributes within the expression are substituted with the values of the attributes corresponding to the row, the row is included in the chat and excluded otherwise.

The following is an example of a CDDF object represented in a textual format.

```
{
    "uuid":"ef1c9476-d3d6-469b-af66-3b729f31241a",
    "title":"My query",
    "source":"http://localhost:5001/vddf/93c2b50f-fa14-44d4-88e1-c2a0c0e64ab7",
    "data":[
    [
      6412,
      5331,
. . .
   1532,
   1319,
   "Women 24 or younger"
   ],
   [
   16348,
   13670,
. . .
   3766,
   3679,
   "Women 25-29"
   ],
. . .
   [
   314,
   285,
. . .
   91,
   88,
   "Women over 45"
   [
```
],
"schema":[
{
"name": "c2005",
"type":"Integer"
},
{
"name": "c2006",
"type":"Integer"
},
. . .
{
"name": "c2014",
"type":"Integer"
},
{
"name": "category",
"type":"String"
}
[,
"visualization":{
"type":"bar",
"query":"select * from excercise_module_4_1 where category like \"Women %\""
}
}
```

The VDDF object specifies metadata as well as data as name value pairs. The information specified in the VDDF object includes a uuid attribute that uniquely identifies the VDDF object, a title attribute that may be displayed during presentation of the VDDF object, a source attribute identifying the data source from where the VDDF object was obtained, a data attribute that represents the values of the dataset, and a schema attribute specifying the metadata describing the dataset, and a visualization attribute describing a visual representation of the dataset.

The schema attribute describes the structure and types of the dataset. For example, the schema attribute may list all the attributes of the dataset and their types. The data attribute represents tuples conforming to the schema. Accordingly, each tuple of the data attribute includes values corresponding to the attributes identified in the schema. For example, if the schema attribute specifies three attributes A, B, and C, each of type integer, the data attribute comprises tuples, each tuple having three values, the first value representing a value of attribute A, the second value representing a value of attribute B, and the third value representing a value of attribute C. There can be several tuples in the data attribute. Each tuple corresponds to a row of the dataset.

The source attribute may be used for refreshing the object with new data or for obtaining additional data for the VDDF object. The source attribute may represent a URL of a server, website, or a file. The VDDF object may include information describing the source, for example, information necessary to establish a session with the source.

The visualization attribute specifies information describing a specific way of visualizing the data. The type attribute within the visualization attribute describes the chart type, for example, a bar chart, a pie chart, line chart, scatter plot, tabular format of data in text form, and so on. Certain parameters of the chart may be configured by default by an application displaying the chart.

The visualization attribute also specifies a query attribute that determines the portion of the data of the dataset of the VDDF that is displayed in the chart. The portion of the data displayed may be a subset of the dataset and may also process the data in various ways, for example, by computing expressions based on the data, by joining the data of the dataset with one or more other datasets. The one or more other datasets with which the data is joined may be other DDFs or other VDDFs.

A VDDF can be transmitted over the network to another system for example, a client device. The client device can process the VDDF object to render a chart that can be presented on a display screen of the client device.

System Architecture for Processing VDDFs

Figure 3:
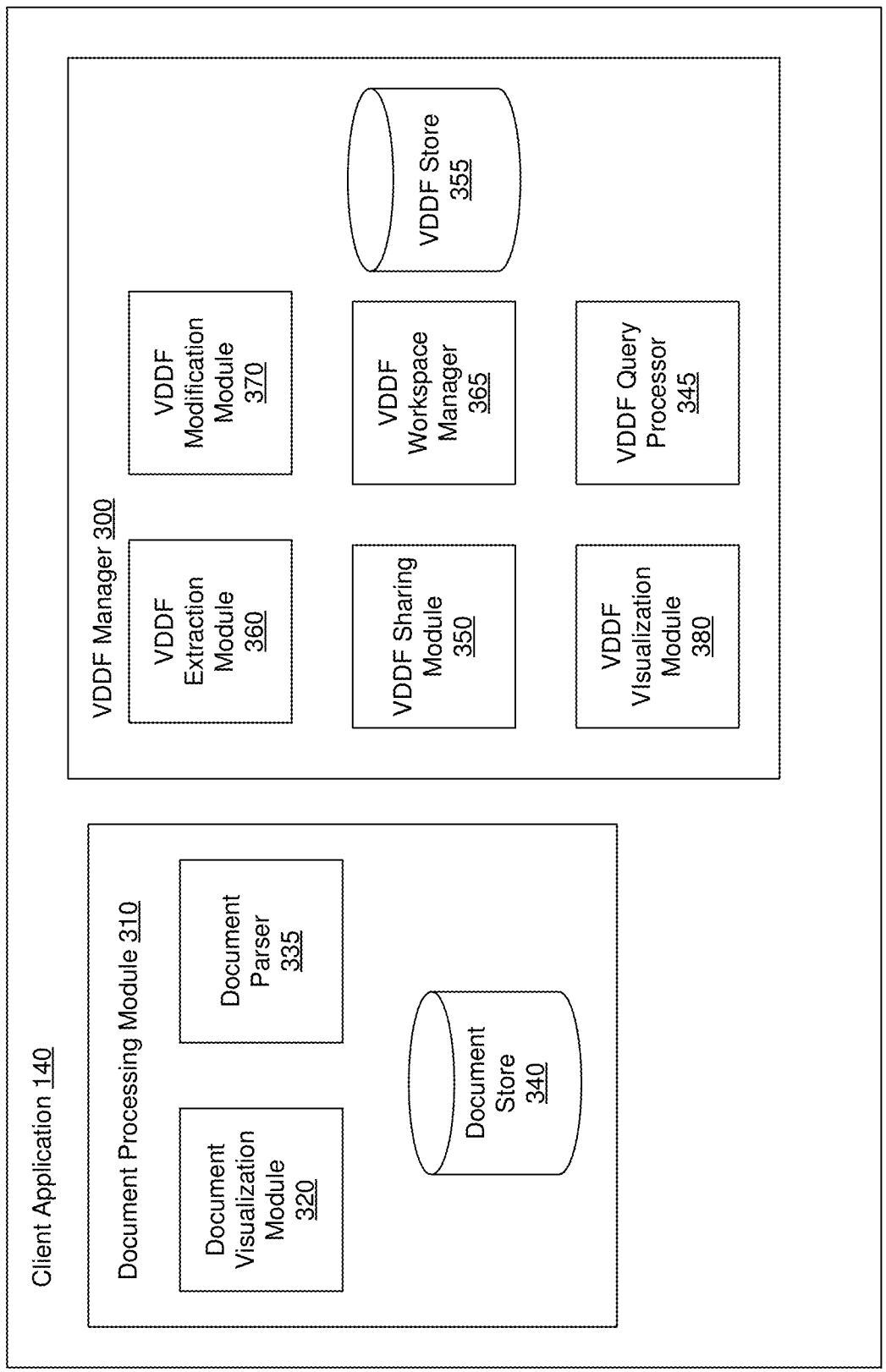
FIG. 3 shows the system architecture of a client application configured to process visual distributed data frames (VDDFs), according to an embodiment.

FIG. 3 shows the system architecture of a client application configured to process VDDFs, according to an embodiment. The client application 140 includes a document processing module 310 and a VDDF manager 300. In an embodiment, the client application 140 is a browser, for example, an internet browser that allows users to interact with websites hosted by web servers. Other embodiments may include more, less, or different modules than those shown in FIG. 3. In an embodiment, client application 140 is configured to receive markup language documents from web servers and display them. Examples of markup language documents processed by the client application 140 include hypertext markup language (HTML), extensible markup language (XML), wireless markup language (WML), and so on.

A markup language document includes content and annotations and instructions associated with the content. For example, a markup language document may include text and instructions for formatting the text. The markup language document may include content, for example, images. The markup language document may include links (for example, uniform resource locators (URLs) that refer to files, images, videos, documents, from the server hosting the markup language document, or from other servers.

The document processing module 310 includes a document visualization module 320, a document renderer 330, a document parser 335, and a document store 340. The document parser 335 parses the markup language document to identify various portions of the markup language document. The document parser 335 builds a representation of the markup language document, for example, a parse tree. In an embodiment, the document parser 335 represents data of the markup language document as a DOM (document object model) tree data structure.

The document store 340 stores the document that is received from a website. The document store 340 may act as a cache that provides fast access to the document. In an embodiment, the document store 340 stores the document for a particular time period and then marks the document for deletion. In some embodiments, the document store 340 includes a fixed amount of storage for storing documents and the documents are deleted on a first-in-first-out basis. Accordingly, the oldest document is identified and deleted. In other embodiments, the documents are deleted on a least recently used basis.

The document visualization module 320 renders the document and presents the document via a display screen of the client device. The document visualization module 320 also allows users to interact using the document if the document includes widgets that support user interactions. Typically, graphs or charts presented in a document do not allow users to interact with the chart.

The VDDF manager comprises a VDDF extraction module 360, a VDDF data editing module 370, a VDDF sharing module 350, a VDDF workspace manager 365, a VDDF visualization module 380, a VDDF query processor 345, and a VDDF data store 355. Other embodiments may include more or fewer module/components. Functionality described herein as being performed by one module may be performed by other modules.

The VDDF store 355 stores data and metadata of VDDFs identified by the VDDF manager 300. For example, the VDDF manager may receive requests to extract VDDFs from one or more documents. The VDDF extraction module 360 extracts these modules and stores the data objects representing the extracted VDDFs in the VDDF store. In an embodiment, the VDDF store 355 stores the data objects in a text format. Alternatively, the VDDF store 355 may store the data objects in binary format that serializes the object. The VDDF manager 300 reconstructs the VDDF data structure from the stored object representation by deserializing the stored object representation.

The VDDF extraction module 360 extracts VDDF data from a given document. The document may be an HTML document, a PDF document, or a document in any other format that allows representations of chart. In an embodiment, the VDDF extraction module 360 invokes the document parser 335 to parse the document. The VDDF extraction module 360 receives a data structure representing the information stored in the document. The VDDF extraction module 360 traverses the data structure representing the document to identify charts. In an embodiment, the charts are identified based on tags associated with various portions of the document. For example, a markup language document may use specific tags that represent chart.

In an embodiment, the VDDF extraction module 360 identifies data presented in the document that may not be associated with a graphical chart but represents a dataset. For example, a portion of a document may simply represent values in a tabular format. The VDDF extraction module 360 represents each set of data represented as a table or chart in the document as a VDDF.

The VDDF visualization module 380 renders and presents visual representation of a VDDF. The VDDF visualization module 380 analyzes the metadata of a VDDF to identify the information related to visualization of the VDDF. The VDDF visualization module 380 determines the subset of data that needs to be visualized, for example, as specified in the query attribute within the visualization attribute of the VDDF described in the example above. The VDDF visualization module 380 determines the type of visualization, for example, as specified in the type attribute within the visualization attribute of the VDDF described in the example above. The VDDF visualization module 380 renders the VDDF and presents it via a display screen.

The VDDF query processor 345 receives and processes queries based on VDDF. For example, a user may execute a query that returns a subset of data of a VDDF, filtered by a given criteria. The VDDF query processor 345 receives and processes queries that join one or more VDDFs. In an embodiment, the VDDF query processor 345 executes the queries within the client device, without requiring a request to be sent to a server. This is so, because the data of all the VDDFs is available within the client device. Accordingly, it is efficient for the VDDF manager to be able to execute queries within the same processor instead of sending the data and the query to another processor for execution.

The VDDF workspace manager 365 presents a user interface that displays a set of VDDFs that may be associated with one or more documents. For example, a user may open an HTML document D1 obtained from a website at URL U1 and extract a set of VDDFs (V1, V2, and V3) from the document D1. The user may then open an HTML document D2 obtained from a website at URL U2 and extract another set of VDDFs (V4, and V5) from the document D1. At this stage, the user may view the complete set of VDDFs extracted across a plurality of documents (including D1 and D2) using the VDDF workspace manager 365. Accordingly, the VDDF workspace manager 365 presents information describing the VDDFs V1, V2, V3, V4, and V5 to the user. The user may execute a query that processes one or more VDDFs presented via the VDDF workspace manager 365. In an embodiment, the VDDF workspace manager 365 presents an identifier for each VDDF presented to the user. The identifier may be a name that uniquely identifies each VDDF and may be descriptive, for example, a string obtained by concatenating keywords obtained from the title of the VDDF.

The VDDF workspace manager 365 presents a widget that allows the user to enter a query, for, example, using a text box. The VDDF workspace manager 365 receives a query from the user and executes the query by invoking the VDDF query processor 345. The VDDF workspace manager 365 allows the user to save the result of the executed query as another VDDF. The query processed by the VDDF query processor 345 may join data of multiple VDDFs presented by the VDDF workspace manager 365. The VDDF workspace manager 365 allows users to specify a query that identifies each VDDF using the identifier presented to the user.

The VDDF workspace manager 365 allows users to share a VDDF presented to the user with other documents. For example, the VDDF workspace manager 365 presents a widget to the user that allows a user to request sharing of a VDDF. The VDDF sharing module 350 processes the request to share the VDDF. The VDDF sharing module 350 transmits the identified VDDF to a system including a server. The VDDF sharing module 350 generates a URL for identifying the VDDF via the server. The VDDF sharing module 350 provides the URL to the user for including in HTML documents that may be posted via a website.

The VDDF modification module 370 receives requests to modify a VDDF, modifies the VDDF according to the request and stores the modified VDDF in the VDDF store 355. In an embodiment, the VDDF workspace manager 365 allows users to edit the data of the dataset of a VDDF. For example, the VDDF workspace manager 365 presents a data editor that allows a user to modify specific values of the dataset of the VDDF, to delete rows or columns, and to add a column. The VDDF workspace manager 365 also allows users to modify the metadata, for example, by changing the visualization of the VDDF. The user may change the query attribute of the VDDF to change the subset of dataset that is visualized or change the type of chart that is presented.

Overall Process

Figure 4:
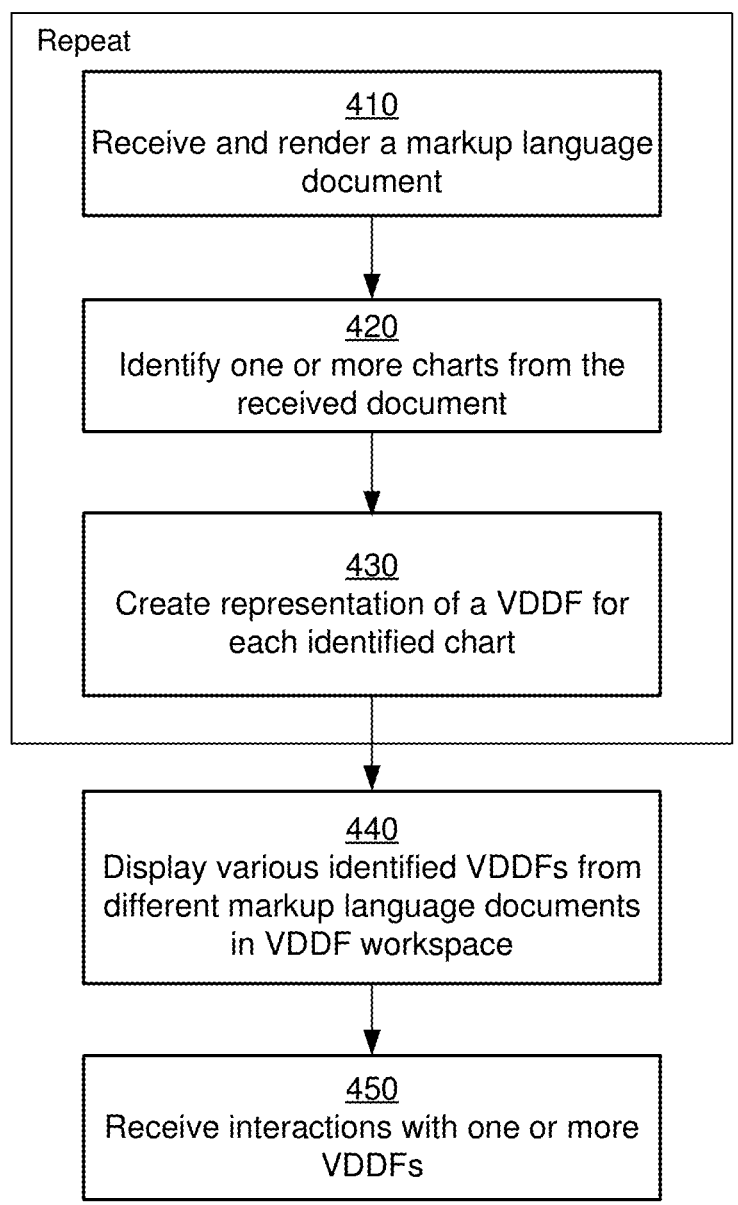
FIG. 4 is a flowchart illustrating the extraction and processing of a VDDF by a client application, in accordance with an embodiment.

FIG. 4 is a flowchart illustrating the extraction and processing of a VDDF by a client application, in accordance with an embodiment. The steps of the flowchart illustrated in FIG. 4 may be executed in an order different from that indicated herein. Furthermore, the steps may be performed by modules other than those indicated herein.

The client application 140 performs the following steps (410, 420, and 430) repeatedly, depending on user input. The document processing module 310 receives 410 a markup language document and renders and presents it via the display of a client device 130. The document processing module 310 may receive the document from a website or any server. The document received may be in any format configured to represent datasets and/or charts, for example, a PDF format, an HTML format, and the like. The VDF extraction module 360 identifies 420 one or more charts from the received document, extracts the information describing the one or more charts, and creates 430 a VDDF data object representation for each of the extracted one or more charts. By repeated the steps 410, 420, and 430, the client application 140 extracts the VDDF objects from multiple documents. However, the process illustrated in FIG. 4 may be performed for a single iteration of the above steps based on a single document. The VDDF manager 300 may store all the extracted VDDFs in the VDDF store 355.

The VDDF workspace manager 365 includes the various VDDFs identified in the step 420 in a workspace. The workspace forms a working set of VDDFs that the user is interacting with. In an embodiment, the VDDF workspace manager 365 allows a user to create multiple workspaces. The VDDF receives information identifying a specific workspace before executing the steps illustrated in FIG. 4. The VDDF workspace manager 365 receives a request to present all the extracted VDDFs that are included in the workspace. The VDDF workspace manager 365 displays 440 the various VDDFs stored in the current workspace.

The VDDF manager 300 receives 450 various interactions from the user with the presented VDDFs. These interactions may include request to edit a VDDF, queries of data from one or more VDDFs, modification of visualization of a VDDF, sharing of a VDDF, and so on. The various components of the VDDF manager 300 perform specific operations based on the VDDF.

Figure 5:
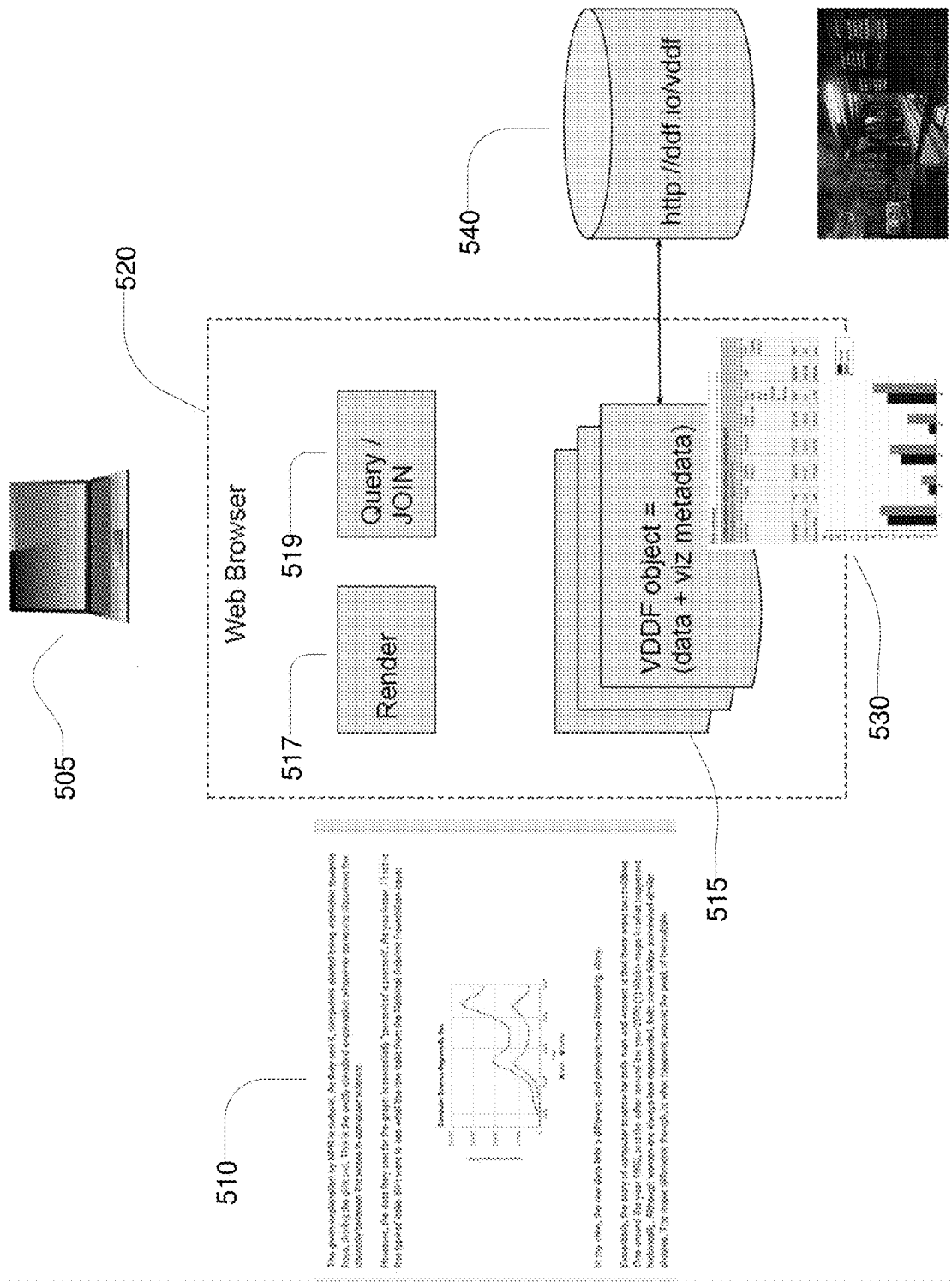
FIG. 5 shows various steps illustrated in the process of FIG. 4, according to an embodiment.

FIG. 5 shows various steps illustrated in the process of FIG. 4, according to an embodiment. As shown in FIG. 5, the web browser 520 executes on the client device 505. The web browser 520 receives the HTML document 510 from a web server. The HTML document 510 includes text as well as a graph (or chart). The web browser 520 extracts the various VDDF objects 515 from the HTML document 510. The web browser 520 renders 517 the various extracted object and presents them to the user via the VDDF workspace manager 365. The web browser 520 may display the data and visualization 530 of each VDDF. The web browser 520 allows users to query 519 the data of various VDDFs including queries that join a plurality of VDDFs. The web browser 520 executes the queries within the client device or within the execution environment of the web browser 520, without sending a request to a server. These queries allow filtering and aggregation of data within the VDDF or across multiple VDDFs. The web browser 520 may receive a request to store the result of a query as a new VDDF.

The VDDF sharing module 350 receives a request to share a particular VDDF extracted from a document to other documents. The VDDF sharing module 350 transmits the data object of the particular VDDF to a server 540 (for example, a web site or a web server). The VDDF sharing module 350 generates a URL for referring to the VDDF stored in the server 540. The VDDF sharing module 350 presents the generated URL to the user. The generated URL can be included in any other document. The generated URL may be included by a web server in an HTML document and the HTML document sent to a browser for display. The generated URL may be included by a client device 505 in a document presented via the display of the client device 505.

Figure 6:
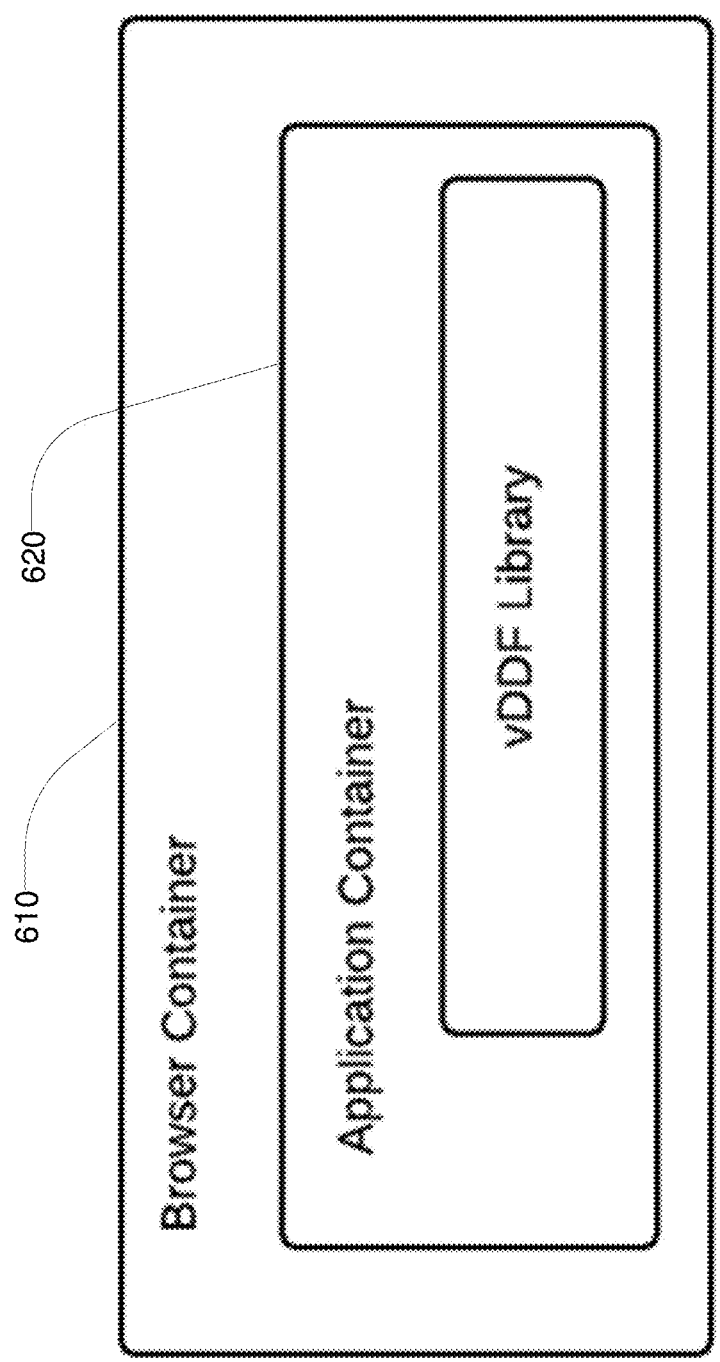
FIG. 6 illustrates execution of VDDFs within containers, according to an embodiment.

FIG. 6 illustrates execution of VDDFs within containers, according to an embodiment. As shown in FIG. 6, a VDDF is represented and processed within a container. The container is the execution environment of the VDDF, where the VDDF instance is created and rendered. An example of a container is the browser. Accordingly, VDDF instances are managed inside the browser environment and rendered using a visualization library. In an embodiment, the browser container 610 includes an application container 620 which further includes a VDDF library. The VDDF library represents instructions for processing a VDDF. An example of an application container is an application provided by the big data analysis system 100 that allows natural language queries for interacting with DDFs. The natural language queries can be directed to VDDFs.

Figure 7A:
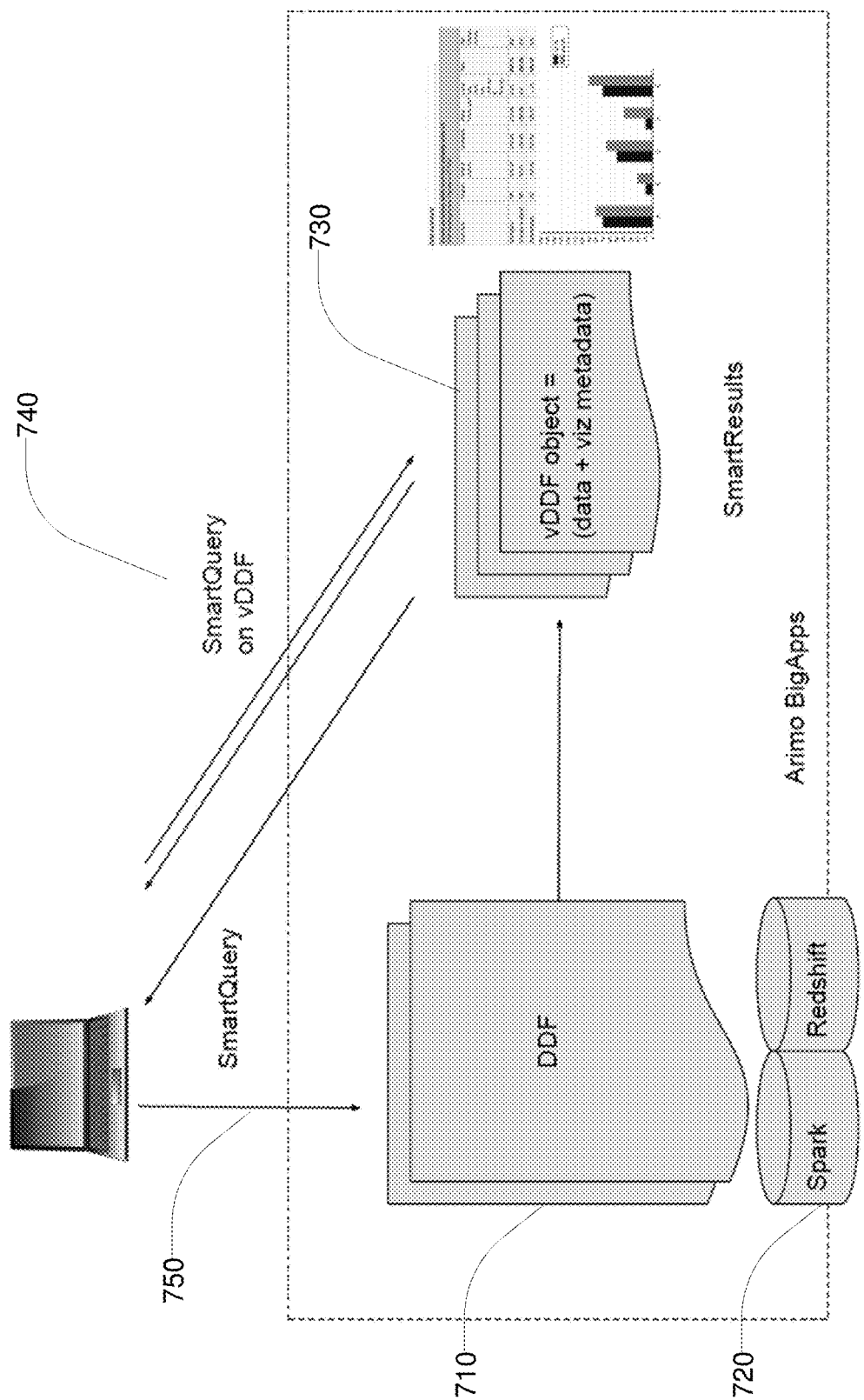
FIG. 7A illustrates use of an application that provides natural language queries for interacting with VDDFs, according to an embodiment.

FIG. 7A illustrates use of an application that provides natural language queries for interacting with VDDFs, according to an embodiment. As shown in FIG. 7, a distributed data framework 200 of a big data analysis system 100 is used to analyze data from various sources 720. The big data analysis system 100 creates DDF objects 710 based on the data retrieved from the sources 720. The big data analysis system 100 provides a natural language query interface 750 for interacting with data stored in the DDFs 710. The big data analysis system 100 receives a request to convert a DDF 710 into a VDDF 730. For example, a client application may retrieve data from a DDF and visualize it as a chart. The chart data may be stored as a VDDF 730. The VDDF library supports a natural language query interface 740 with the VDDF object(s). In an embodiment, the query interface 730 and 750 may be used to join data from a VDDF with data of a DDF.

Figure 7B:
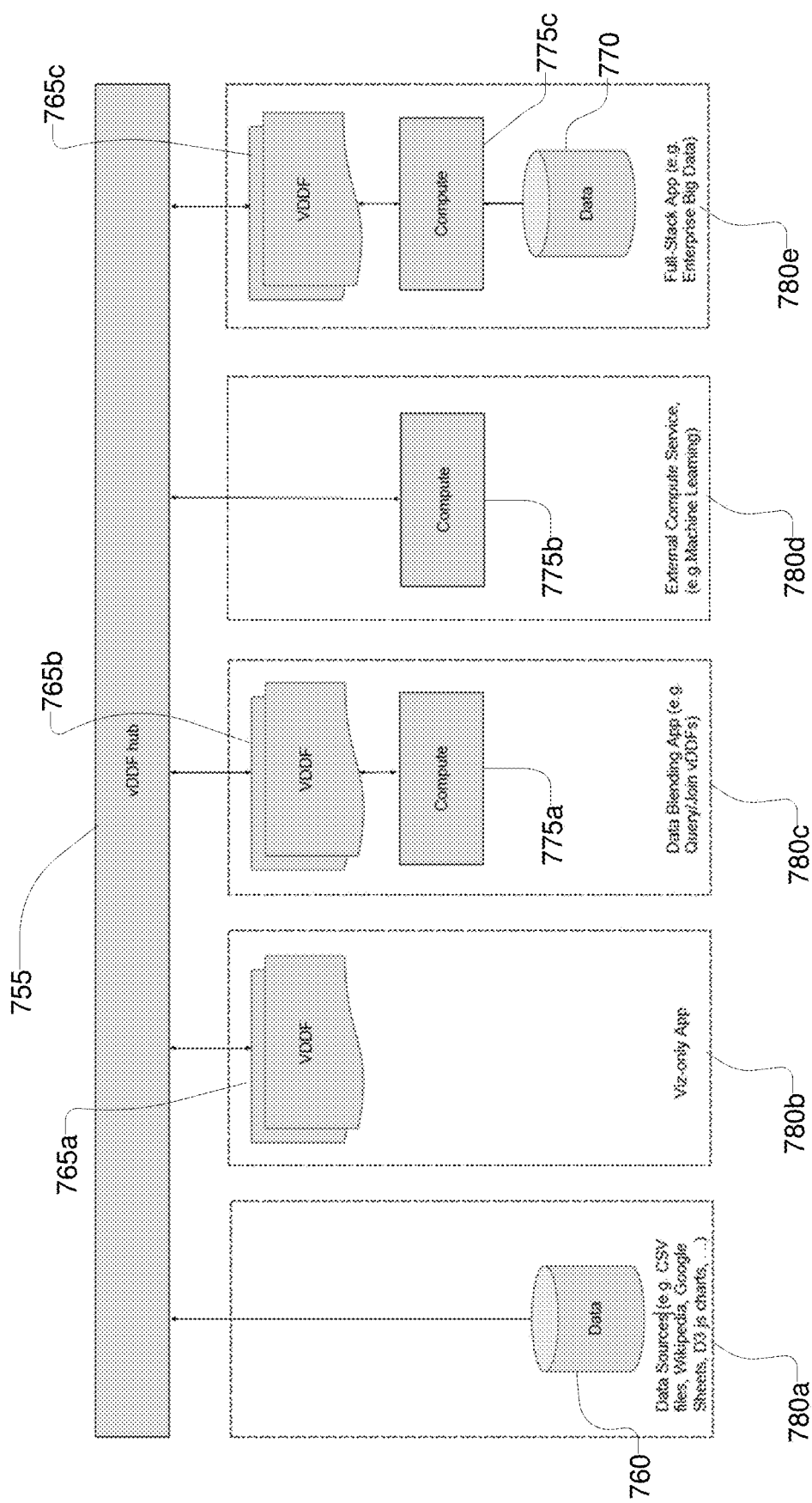
FIG. 7B illustrates an environment that allows interoperability between various types of applications using VDDFs, according to an embodiment.

FIG. 7B illustrates an environment that allows interoperability between various types of applications using VDDFs, according to an embodiment. Although VDDFs are configured to store data, metadata describing the data, and metadata describing visualization, an application may choose to use only a portion of the information stored in a VDDF. Different applications may interact using VDDFs. As shown in FIG. 7B, a VDDF hub 755 comprises modules that allow interaction between various computing systems (including servers and client devices) based on VDDFs. The VDDF hub 755 includes modules executing on each computing system (or device) that allows transmitting and receiving VDDFs. In an embodiment, the VDDF hub transmits a VDDF by serializing an object representation of the VDDF. The VDDF hub 755 executing on a computing system that receives the VDDF deserializes the received data to generate a VDDF object. In an embodiment, the serialization of a VDDF object comprises converting the VDDF object into a text representation, for example, a JSON (JavaScript Object Notation) object.

The various types of applications 780 that interact using the VDDF hub 755 include the following. An application 780a may retrieve data from a data source 760 for example, a spread sheet (e.g., comma separate values (CSV) file), a markup language document (e.g., an HTML or XML document), a chart represented in any document (e.g., a document represented as a portable document format (PDF)). The application 780a may execute on a server or on a client device.

Application 780b is an application that performs visualization of the data represented as a VDDF. The VDDF may have been received by the computing device from another system. Alternatively, the computing device may extract the VDDF from a document received by the computing device for rendering.

Application 780c combines information from multiple VDDFs or information stored on VDDFs with other data sources. For example, an application 780c may comprise a query engine 775a that executes a query that joins data stored in two VDDFs. Alternatively, the application 780c may execute a query that joins data stored in a VDDF with data stored in another data source, for example, data source 760. The application 780c may store the result as a new VDDF and either render the resulting VDDF or send the resulting VDDF via the VDDF hub 755 to another computing system for processing.

Application 780d receives result from a computing service 775b and generates a VDDF based on the result. The computing service 775b may be a process that generates data, for example, a machine learning module that receives data and generates output that is represented as VDDFs. In an embodiment, the computing service 775b receives data as streams and periodically generates results as VDDFs.

The application 780e includes one or more data sources, one or more computing engines or services 775c that process the data to generate VDDFs 765c. For example, the application 780e may be a big data analysis system 100. Accordingly, the result of big data analysis One or more data sources of the application 780e may represent data as VDDFs.

Figure 8:
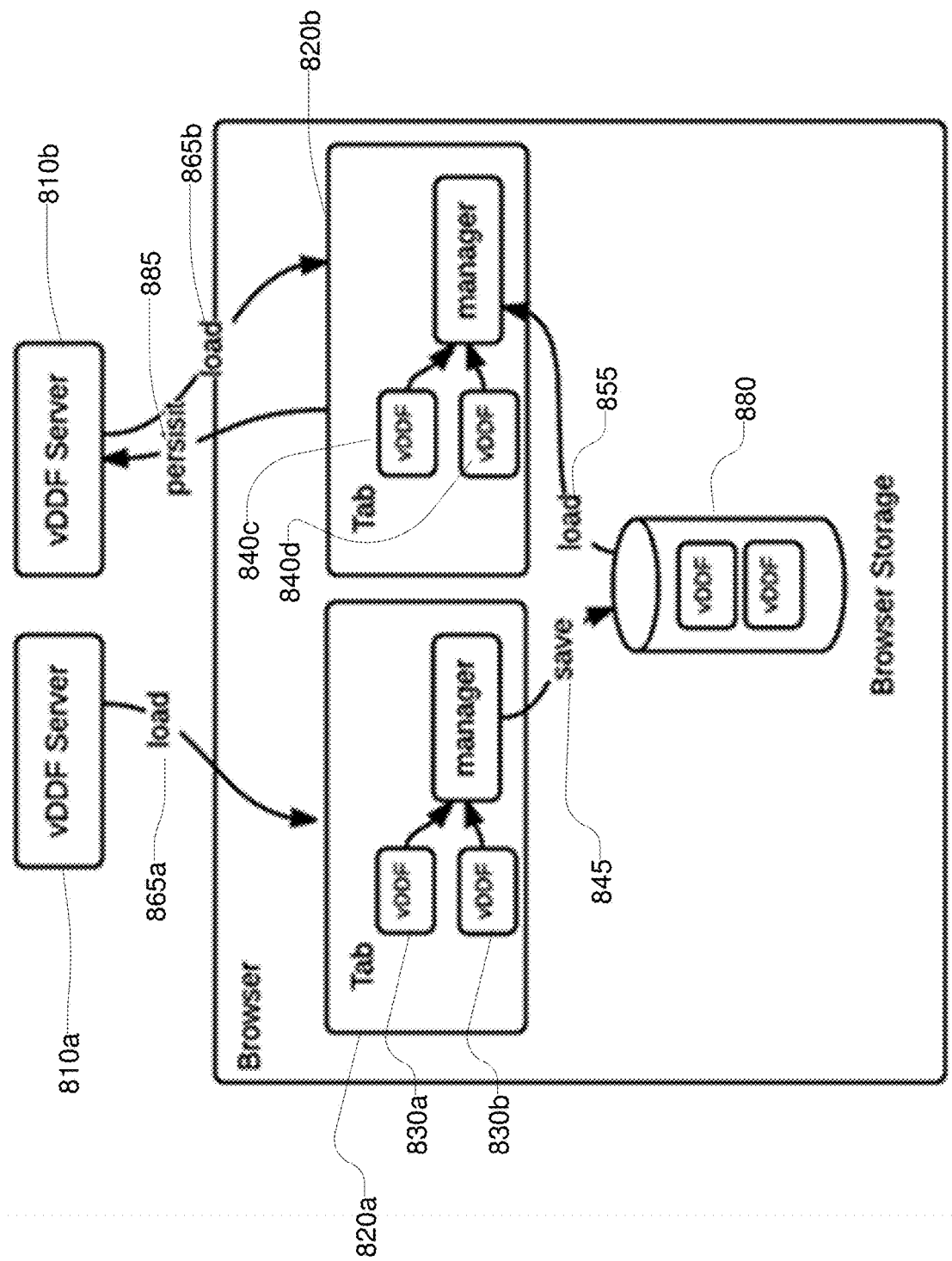
FIG. 8 illustrates sharing of a VDDF extracted by a browser with other documents, according to an embodiment.

FIG. 8 illustrates sharing of a VDDF extracted by a browser with other documents, according to an embodiment. A browser loads 865a a document comprising charts from a server, for example, a big data analysis system 100 identified as a VDDF server 810a. The chart representation of the data may be presented via a tab 820a of the browser. The VDDF manager 300 may show one or more VDDFs 830a, 830b extracted from the document. The VDDF manager 300 receives a request to save 845 one or more VDDFs 830. The VDDF manager 300 saves 845 the VDDFs in a local storage of the browser, for example, the browser storage 880.

The browser may include a stored VDDF in another document or may display the VDDF via a VDDF workspace manager 365 in another tab 820b of the browser. The VDDF manager 300 may receive a request to share a VDDF. Accordingly, the VDDF manager 300 persists 885 the VDDF on a VDDF server 810b, for example, a web server. The VDDF manager 300 generates a URL based on the representation of the VDDF in the VDDF server 810b. The VDDF stored on the VDDF server 810b can be loaded 865b by the browser of the above client device or by a browser of another client device. Accordingly, a VDDF created by a browser of one client device can be shared with browsers executing on other client devices.

User Interfaces for Processing VDDFs

Figure 9:
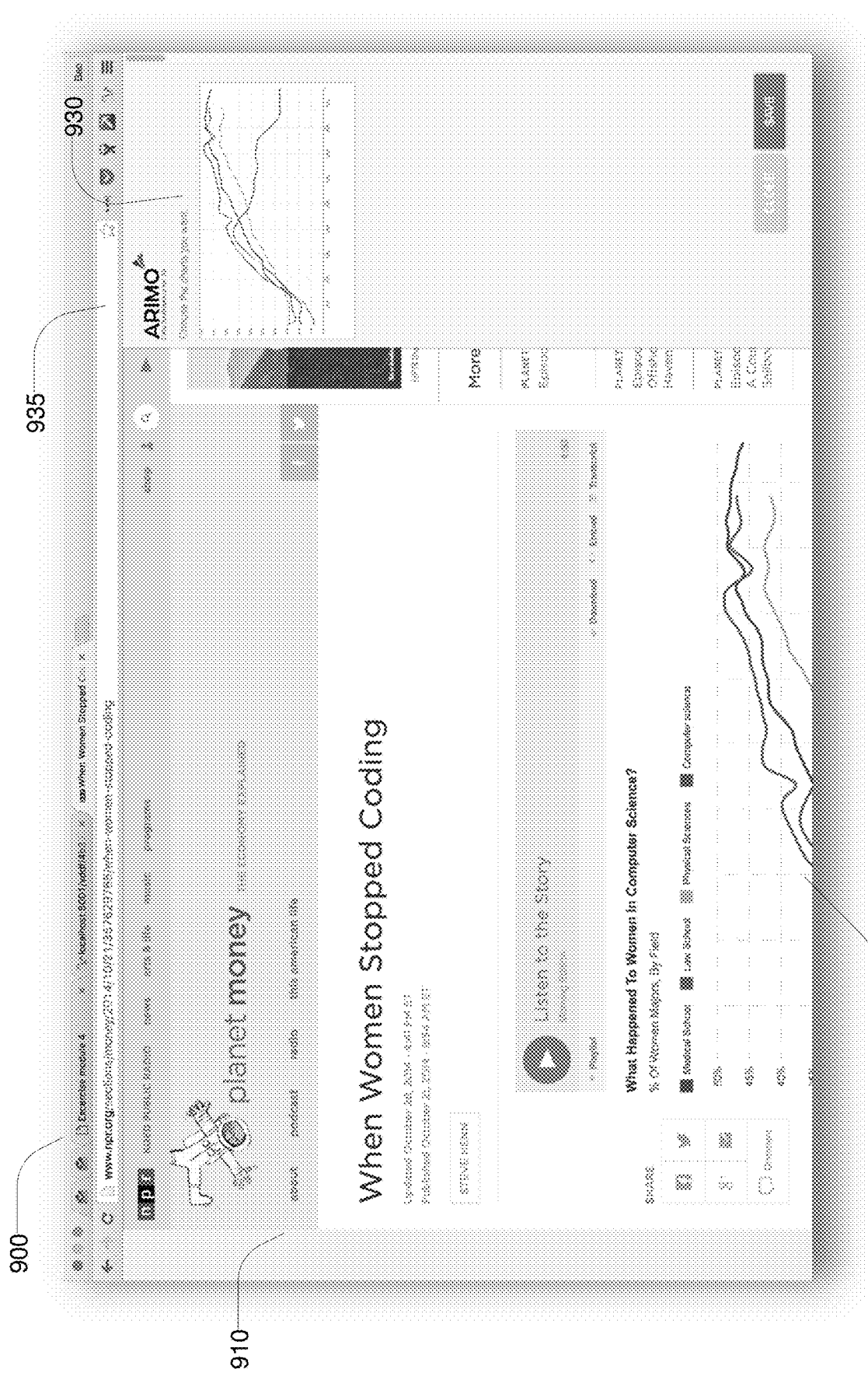
FIG. 9 shows a screen shot of a user interface illustrating extraction of a VDDF from an HTML document displayed by a browser, according to an embodiment

FIG. 9 shows a screen shot of a user interface illustrating extraction of a VDDF from an HTML document displayed by a browser, according to an embodiment. The browser 900 receives an HTML document 910 from a website and renders and presents it via the display of the client device. The HTML document includes a chart 920 (a line chart). Typical charts do not allow interactions with the chart, for example, to inspect additional information about a data point, to change the charge type, or to perform any other operation. The VDDF framework allows a user to perform various operations using the chart that are not allowed by the client application (browser 900) using the original document 910 that was received from the website. The VDDF extraction module 360 identifies the chart 920 from the HTML document 910 and extracts the data of the chart 920. The VDDF visualization module 380 presents a visual representation 930 of all the charts extracted from the HTML document 910. In an embodiment, all VDDFs extracted from a document are presented in a panel 935 presented adjacent to the HTML document, for example, on the right hand side of the HTML document.

Figure 10:
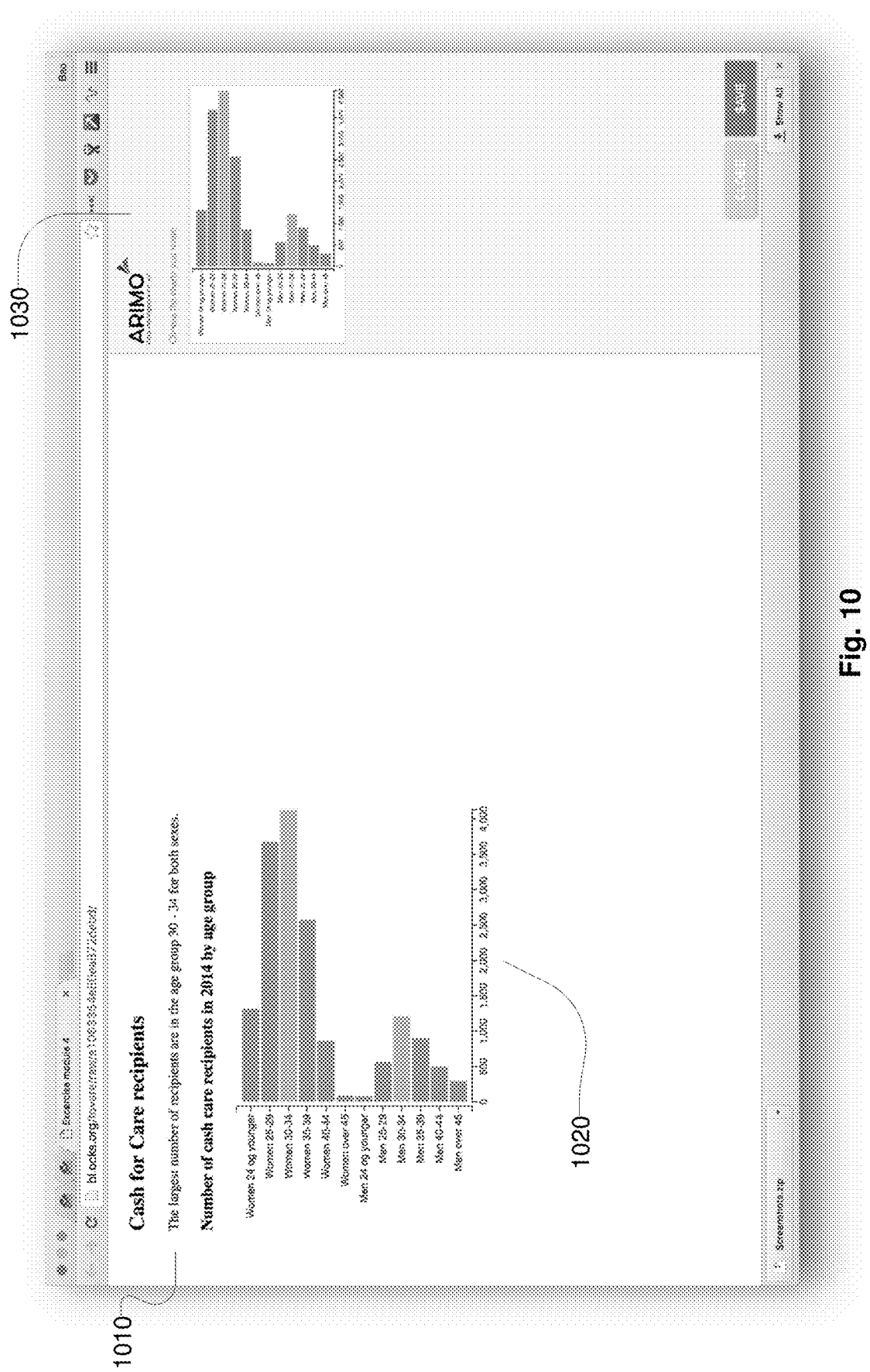
FIG. 10 shows another screen shot of a user interface illustrating extraction of a VDDF from an HTML document displayed by a browser, according to an embodiment.

FIG. 10 shows another screen shot of a user interface illustrating extraction of a VDDF from an HTML document displayed by a browser, according to an embodiment. The HTML document 910 is retrieved by the browser and presented via the display of the client device. The VDDF extraction module 360 identifies the chart 1020 from the HTML document 1010 and extracts the data of the chart 1020. As shown in FIG. 10, the chart 1020 is a bar chart. The VDDF visualization module 380 presents a visual representation 1030 of all the charts extracted from the HTML document 1010.

Figure 11:
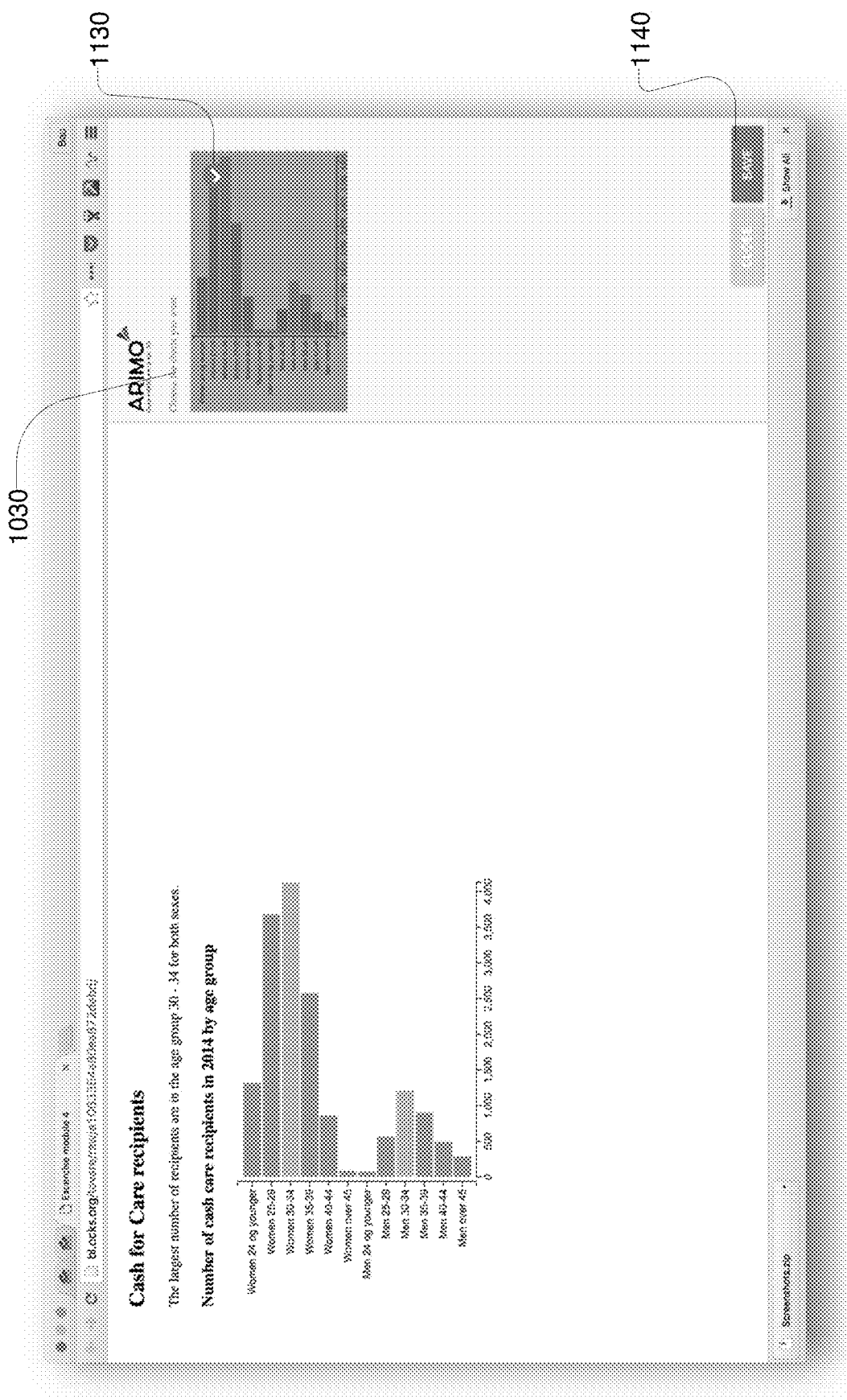
FIG. 11 shows a screen shot of a user interface illustrating selection of one or more VDDFs from all the VDDFs extracted from an HTML document, according to an embodiment.

FIG. 11 shows a screen shot of a user interface illustrating selection of one or more VDDFs from all the VDDFs extracted from an HTML document, according to an embodiment. The VDDF extraction module 360 may extracts data of multiple charts from a markup language document. The VDDF visualization module 380 presents a visual representation 930 of all the charts extracted from the HTML document 910. The user interface shown in FIG. 11 shows a widget 1130 presented to the user for allowing selection of a subset (or all) of the VDDFs extracted from the HTML and displayed in the panel on the right hand side of the HTML document. The user interface includes a widget 1140 that allows the selected VDDFs to be saved in a local storage, for example, the browser storage 880.

Figure 12:
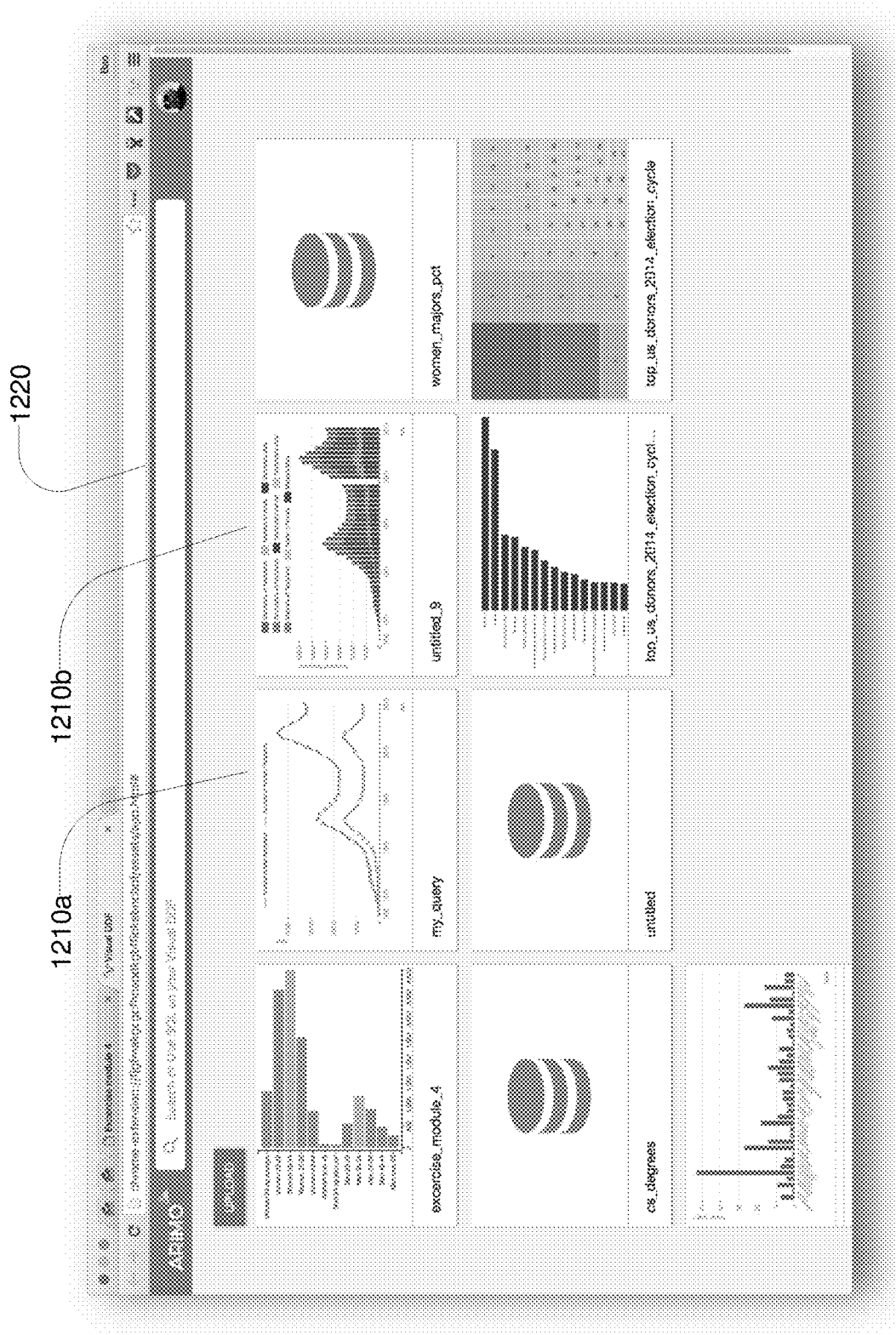
FIG. 12 shows a screen shot of all VDDFs added to a workspace, according to an embodiment.

FIG. 12 shows a screen shot of all VDDFs added to a workspace, according to an embodiment. The VDDF manager 300 allows users to add VDDFs to a workspace. In an embodiment, all VDDFs are added to a default workspace. Alternatively, the VDDF manager 300 receives an identification of a specific workspace to which a VDDF is saved. The browser shows all VDDFs 1210 included in a workspace. The VDDF visualization module 380 visualizes the VDDFs using the visualization metadata stored in the VDDF. The user interface further presets a widget 1220 to receive from the user, an input query based on one or more of the VDDFs of the workspace. The VDDF manager processes queries that join data from two VDDFs that may be from the same HTML document or from different HTML documents.

Figure 13:
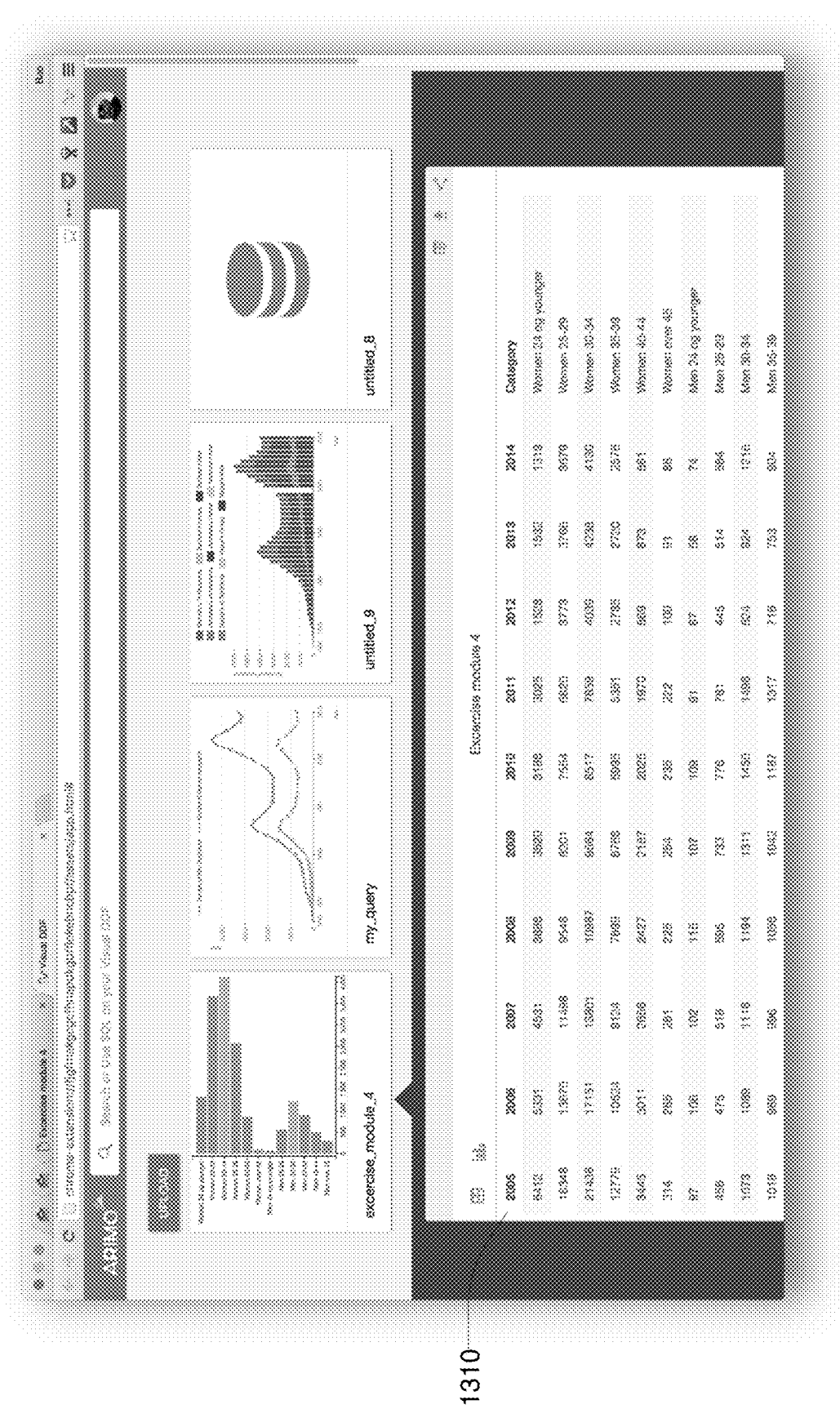
FIG. 13 shows a screen shot presenting underlying data from a VDDF, according to an embodiment.

FIG. 13 shows a screen shot presenting underlying data from a VDDF, according to an embodiment. The user interface allows users to select a particular VDDF from the workspace and display the data 1310 underlying the chart presented in the original document. The data 1310 is typically not visible in the original document from which the VDDF was extracted. This is so, because the charts typically present a visual representation that does not include large amount of textual information. The data 1310 presented by the user interface may include columns and rows that are not presented in the chart presented in the original document.

Figure 14:
FIG. 14 shows a screen shot of a user interface for changing the chart type associated with a VDDF, according to an embodiment.

FIG. 14 shows a screen shot of a user interface for changing the chart type associated with a VDDF, according to an embodiment. The VDDF work space manager 365 presents a user interface that presents a list of chart types 1410 including bar chart, line chart, pie chart, donut chart, heat map, tree map, and so on. The user interface allows the user to modify the chart type associated with a VDDF. If the user selects a different chart type for the VDDF, the user interface presents a chart based on the selected chart type and saves the selected chart type as the visualization metadata of the VDDF. The user interface also presents various dimensions of the dataset that may or may not be displayed in the chart as presented in the original document. The user interface allows the user to view the values for a particular dimension, for example, as a drop down list 1420 that allows the user to select one or more values. The user interface allows the user to change values of one or more dimensions, thereby changing the data set that is being displayed.

Figure 15:
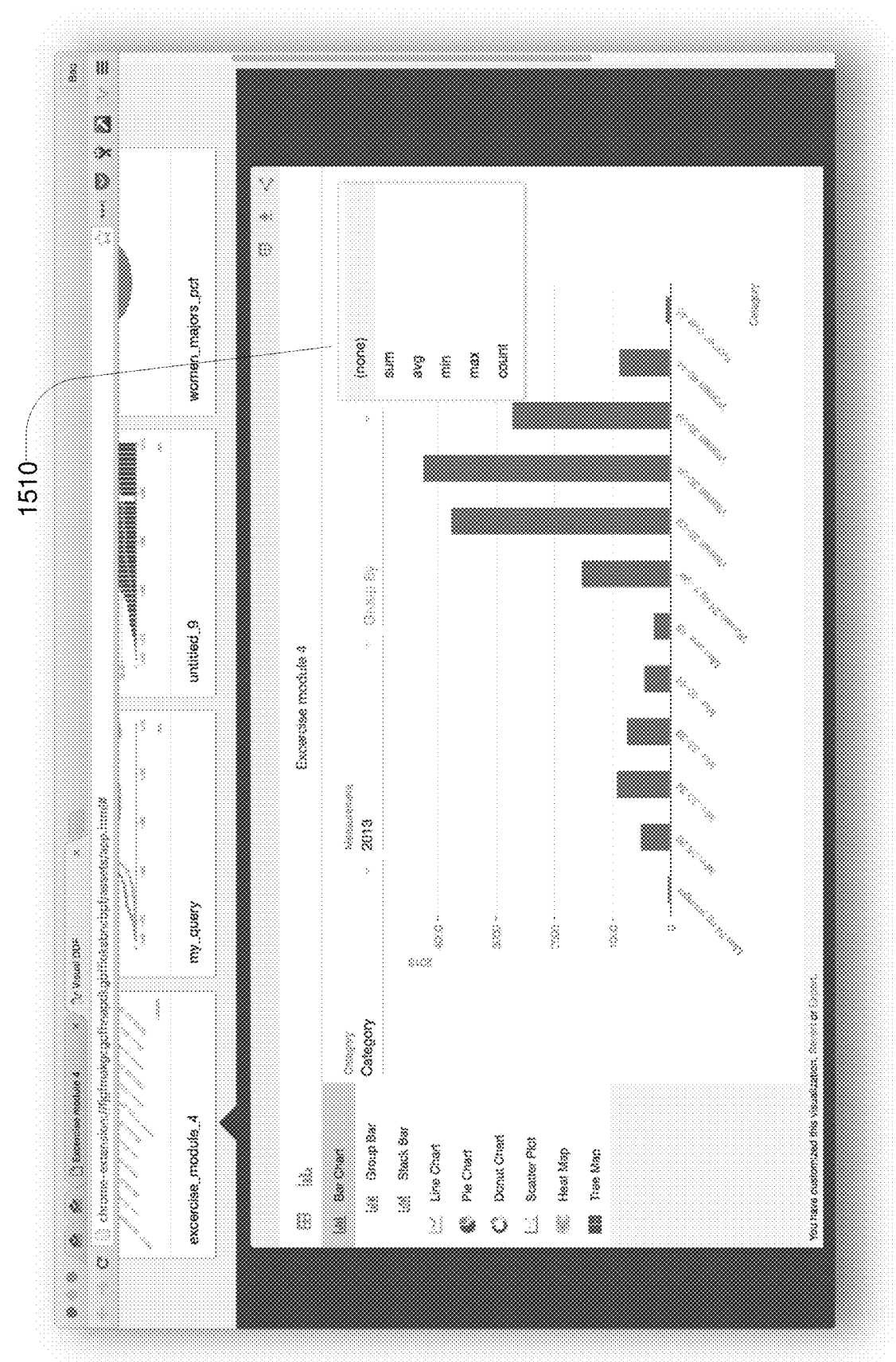
FIG. 15 shows a screen shot of a user interface for modifying the query that determines the dataset being presented in the VDDF, according to an embodiment.

FIG. 15 shows a screen shot of a user interface for modifying the query that determines the dataset being presented in the VDDF, according to an embodiment. The user interface allows the user to add various clauses to the query, for example, grouping by certain attribute, and performing certain aggregation function 1510 over an entire column or over groups of values if the query specifies a group by clause. The VDDF modification module 370 receives the modifications to the query and saves the modified query. The VDDF visualization module 380 presents a chart based on the result of the modified query.

Figure 16:
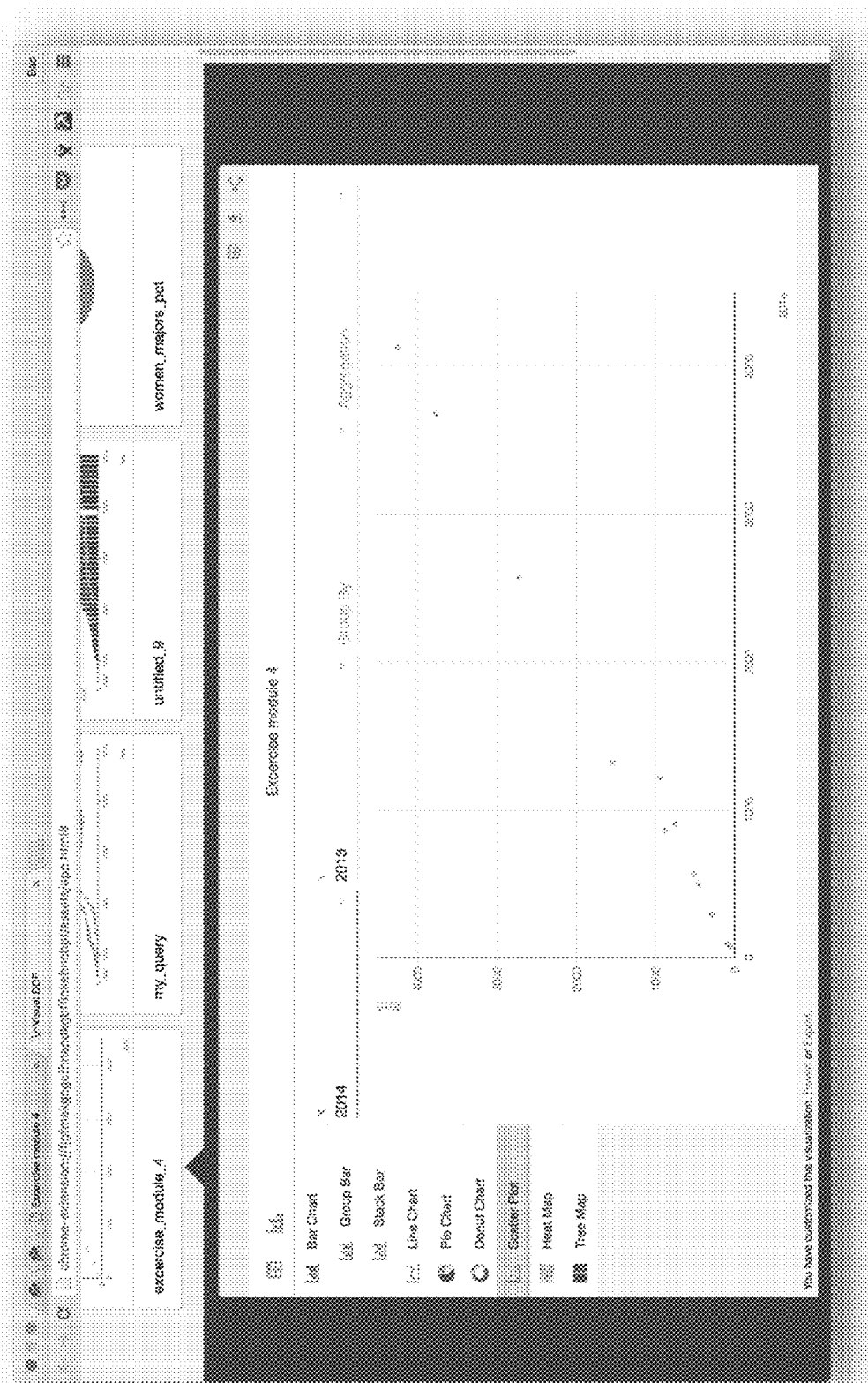
FIG. 16 shows a screen shot of a user interface showing a scatter plot obtained by modifying the chart type, according to an embodiment.
Figure 17:
FIG. 17 shows a screen shot of a user interface showing a heat map obtained by modifying the chart type, according to an embodiment.

FIG. 16 shows a screen shot of a user interface showing a scatter plot obtained by modifying the chart type, according to an embodiment. The user interface allows the user to modify the chart type. Accordingly, the visualization of the chart may be changed to a scatter plot as shown in FIG. 16. Similarly, FIG. 17 shows a screen shot of a user interface showing a heat map obtained by modifying the chart type, according to an embodiment.

FIG. 18 shows a screen shot of a user interface for editing data of the dataset of a VDDF, according to an embodiment. The user interface presented in FIG. 18 presents widgets 1810 that allow a user to modify specific data elements of the VDDF. The user interface further allows users to add columns, delete columns, modify metadata (for example, names of columns), and so on. The modifications to the data are received by the VDDF modification module 370. The VDDF modification module 370 applies any changes received via the user interface to the stored VDDF representation.

Figure 19:
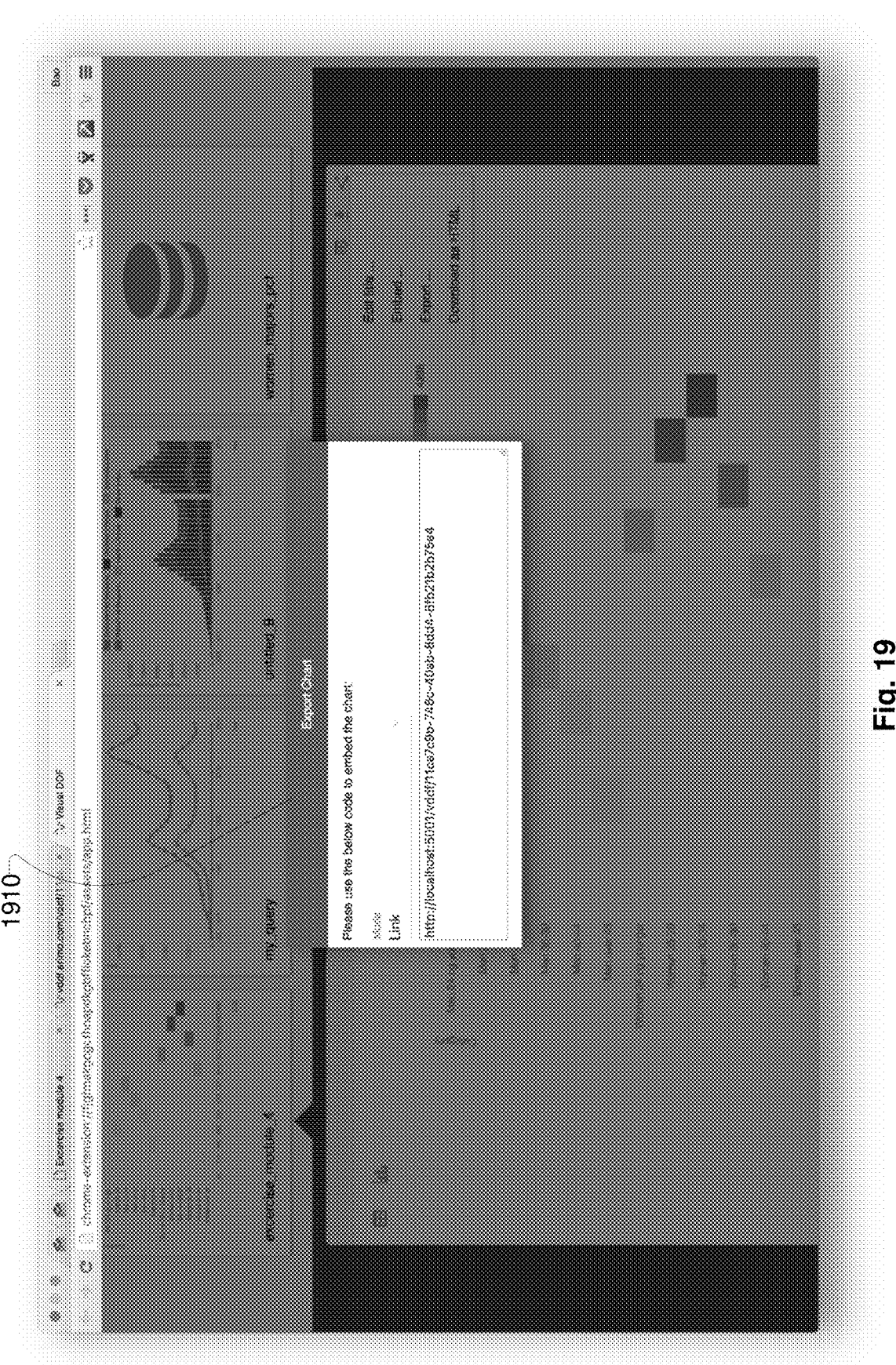
FIG. 19 shows a screen shot of a user interface for sharing a VDDF, according to an embodiment.

FIG. 19 shows a screen shot of a user interface for sharing a VDDF, according to an embodiment. The user interface receives an input from the user requesting the VDDF manager 300 to export the VDDF for sharing with other client devices via documents presented via the client devices. The VDDF sharing module 350 exports the VDDF and stores the VDDF in a server, for example, a VDDF server 810 which may be a web server. The VDDF sharing module 350 generates a URL for identifying the VDDF stored in the VDDF server. The user interface presents the URL via the widget 1910. The user can include the URL presented in a document that may be hosted or generated by a webserver and presented to other client devices. Accordingly, the VDDF manager 300 receives charts based on data received from a browser and makes the chart available to browsers executing on other client devices.

Figure 20:
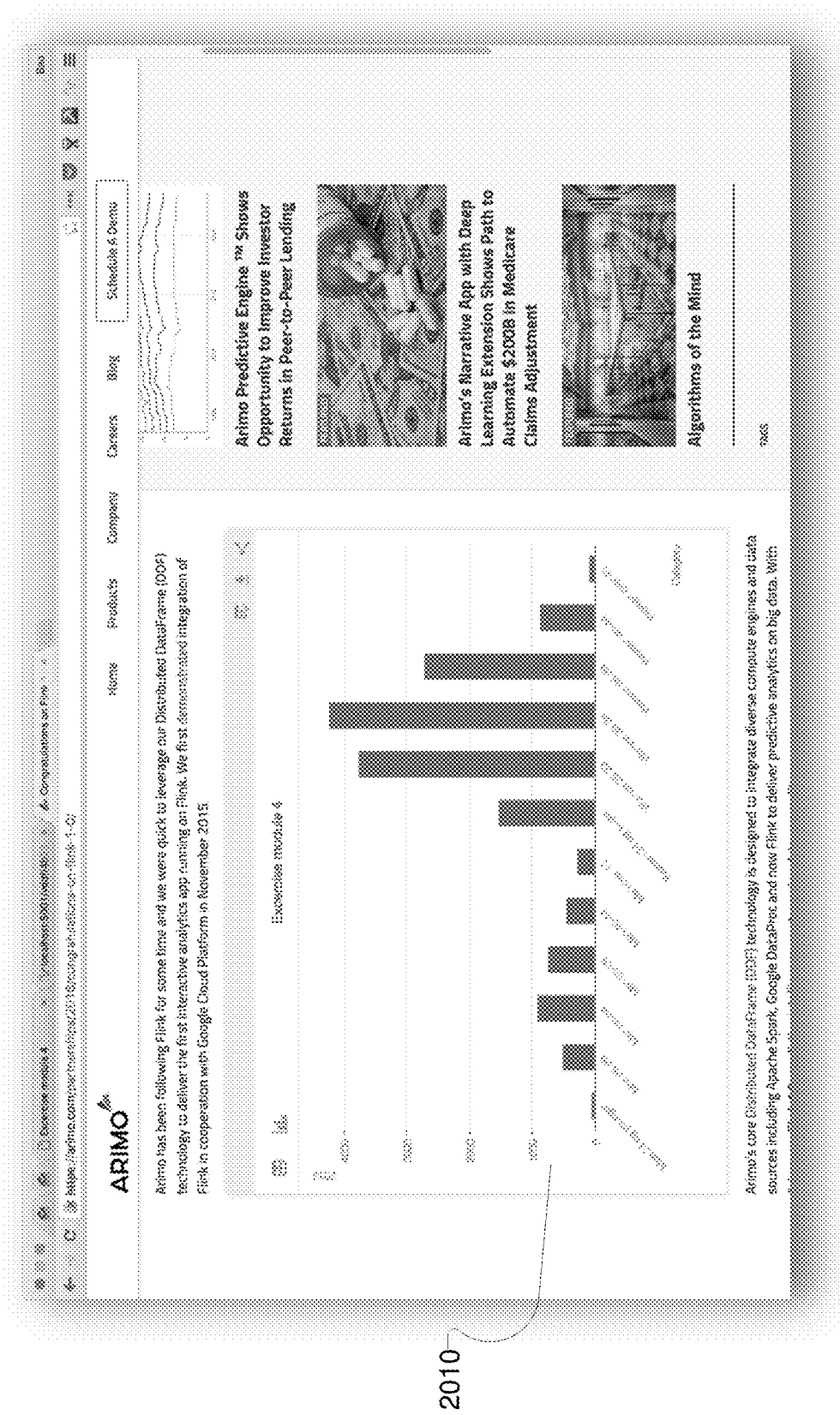
FIG. 20 shows a screen shot of a user interface illustrating document including a chart shared from a document presented via another browser, according to an embodiment.

FIG. 20 shows a screen shot of a user interface illustrating document including a chart shared from a document presented via another browser, according to an embodiment. The URL shown in FIG. 19 may be included in another document that is hosted by a particular webserver. The resulting document is shown via a browser in FIG. 20 and includes the shared document 2010. A document that is shared may be included in multiple documents, each presented via a browser.

Figure 21:
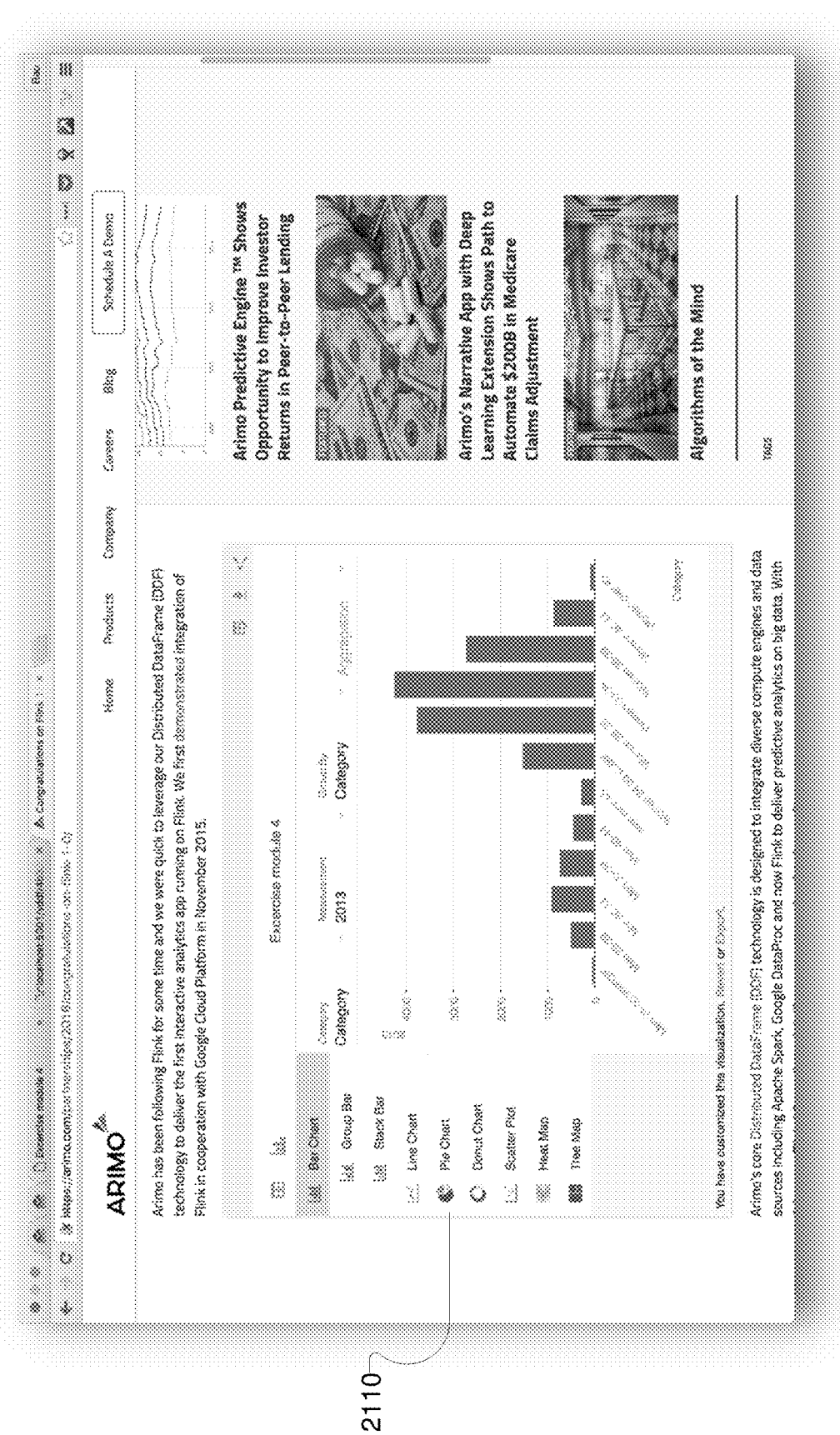
FIG. 21 shows a screen shot of a user interface illustrating modification of the VDDF embedded in a document, according to an embodiment.

FIG. 21 shows a screen shot of a user interface illustrating modification of the VDDF embedded in a document, according to an embodiment. If a document is presented via a browser that conforms to the data format of a VDDF and the browser executes the VDDF library comprising instructions of the VDDF manager 300, the user interface allows users to modify the VDDF within the document. Accordingly, the user interface of FIG. 21 presents the various widgets 2110 described above that allow the user to modify the VDDF including the data of the VDDF, the chart type of the VDDF, the query of the VDDF that determines the subset of the data visualized, and so on.

FIG. 22 shows a screen shot of a user interface illustrating modification of a chart type of a VDDF embedded in a document, according to an embodiment. The user interface of FIG. 21 allows users to modify the chart type. The user interface modifies the chart type of the VDDF and presents the modified chart based on the VDDF within the document. Different browsers executing on different client devices may locally modify the chart type without affecting the chart type of the VDDF presented on other client devices.

Figure 23:
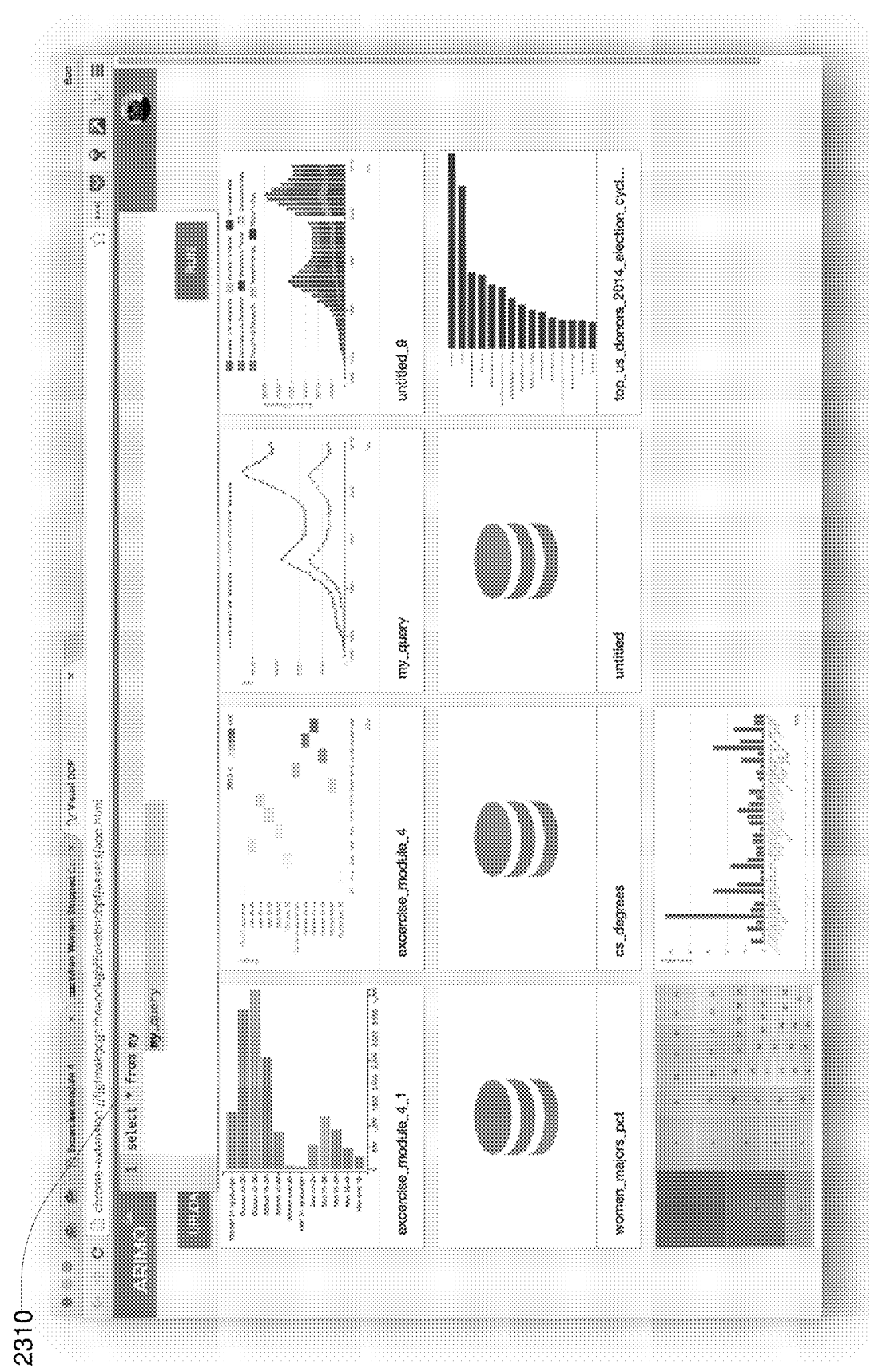
FIG. 23 shows a screen shot of a user interface illustrating execution of queries based on VDDFs of a workspace, according to an embodiment.

FIG. 23 shows a screen shot of a user interface illustrating execution of queries based on VDDFs of a workspace, according to an embodiment. The user interface presents a widget 2310 that allows users to enter a query based on VDDFs in the workspace. The VDDF query processor 345 processes the query and may present the results. The user interface further allows the user to save the query as a new VDDF. Accordingly, the user can associate the query with a particular chart type. The user interface allows the user to export the VDDF for sharing with other documents. Accordingly, the VDDF manager 300 allows users to store VDDFs from one or more documents, define a new VDDF based on one or more saved VDDFs (that may be from different documents), and then share it with other browsers by including the new VDDF in a document.

Computer Architecture

Figure 24:
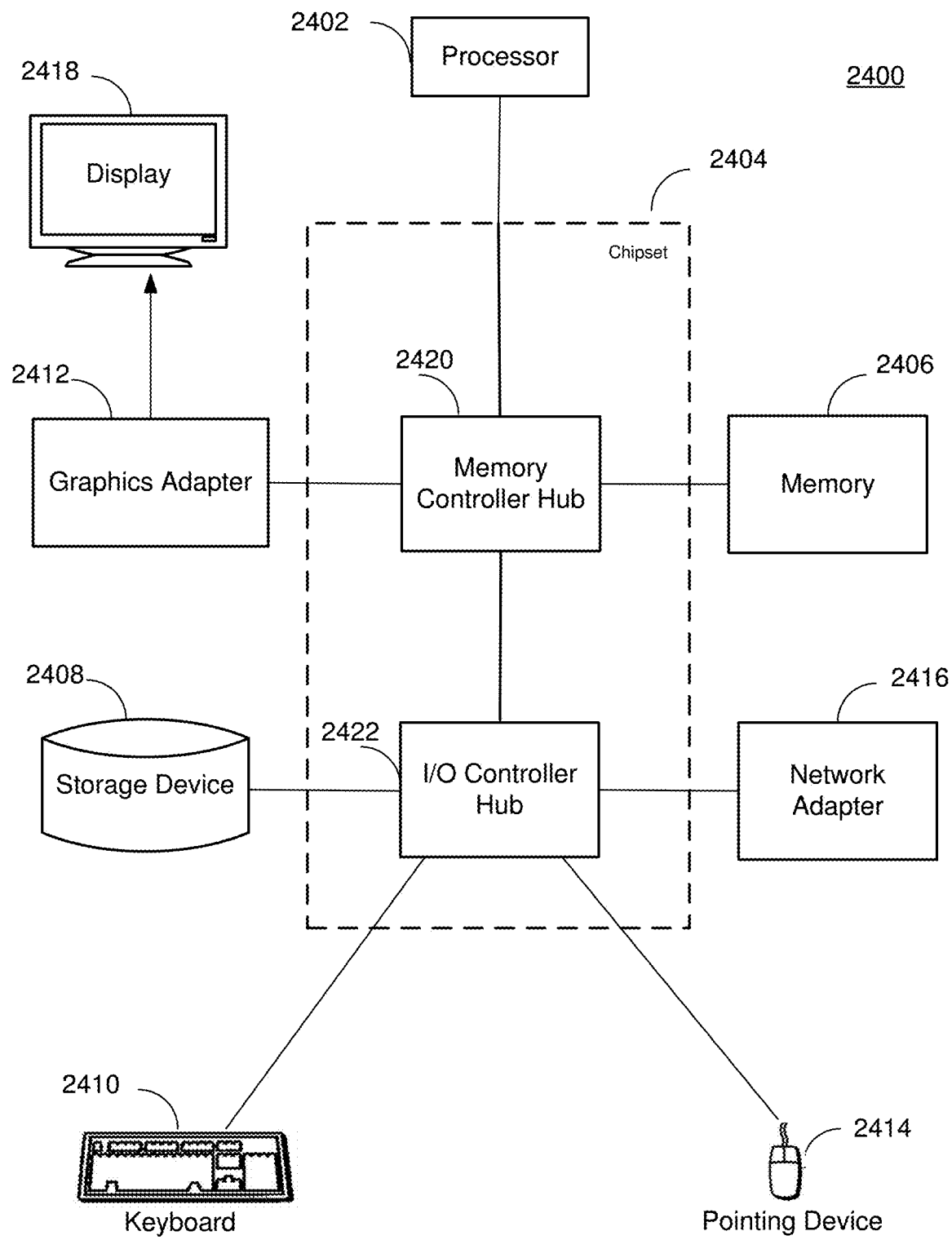
FIG. 24 is a high-level block diagram illustrating an example of a computer for use as a system for performing formal verification with low power considerations, in accordance with an embodiment.

FIG. 24 is a high-level block diagram illustrating an example of a computer for use in compression of scenarios, in accordance with an embodiment. The computer 2400 includes at least one processor 2402 coupled to a chipset 2404. The chipset 2404 includes a memory controller hub 2420 and an input/output (I/O) controller hub 2422. A memory 2406 and a graphics adapter 2412 are coupled to the memory controller hub 2420, and a display 2418 is coupled to the graphics adapter 2412. A storage device 2408, keyboard 2410, pointing device 2414, and network adapter 2416 are coupled to the I/O controller hub 2422. Other embodiments of the computer 2400 have different architectures.

The storage device 2408 is a non-transitory computer-readable storage medium such as a hard drive, compact disk read-only memory (CD-ROM), DVD, or a solid-state memory device. The memory 2406 holds instructions and data used by the processor 2402. The pointing device 2414 is a mouse, track ball, or other type of pointing device, and is used in combination with the keyboard 2410 to input data into the computer system 2400. The graphics adapter 2412 displays images and other information on the display 2418. The network adapter 2416 couples the computer system 2400 to one or more computer networks.

The computer 2400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 2408, loaded into the memory 2406, and executed by the processor 2402. The types of computers 2400 used can vary depending upon the embodiment and requirements. For example, a computer may lack displays, keyboards, and/or other devices shown in FIG. 24.

Although embodiments disclosed herein describe natural language interface for interacting with big data analysis system, the techniques disclosed herein may be applied for any type of data analysis system. For example, the embodiments can be used for interacting with smaller data sets and are not limited to large datasets. Similarly, the embodiments can be used for interacting with simple datasets, for example, data sets that are uniform and have the same type of data instead of a complex mix of unstructured and structured data.

Alternative Embodiments

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for processing datasets presented via documents received by a client device, the method comprising:
    receiving by a web browser application executing on the client device, one or more markup language documents transmitted from one or more first web servers, each markup language document comprising one or more charts;
    presenting, via one or more tabs of the web browser application, a plurality of charts described in the one or more markup language documents, at least one of the charts presented in a first tab of the web browser application;
    extracting data associated with the plurality of charts;
    storing in a local storage of the web browser application, visual distributed data frames (VDDFs) representing data objects representing the extracted data, each VDDF comprising the extracted data of one of the plurality of charts and metadata describing visualization of the extracted data as one of the charts, the VDDFs stored in the local storage of the web browser application accessible by a plurality of web servers in communication with the client device via different tabs of the web browser application;
    receiving, by a second web server via a second tab of the web browser application, a query for one or more of the plurality of charts, the second tab different from the first tab, the second web server different from the one or more first web servers;
    executing the received query on the VDDFs stored in the local storage of the web browser application that is accessible both the first web servers and the second web server;
    storing in the local storage of the web browser application, the result of the executed query as a VDDF; and
    sharing the stored VDDF associated with the executed query with one or more other documents configured for presentation via other web browser applications executing on other client devices.

2. The method of claim 1, wherein sharing the stored VDDF associated with the executed query comprises:
    exporting the stored VDDF to the second web server;
    generating a uniform resource locator (URL) for identifying the stored VDDF via the second web server;
    including the URL in a new markup language document; and
    sending the new markup language document for display via one or more web browser applications.

3. The method of claim 1, further comprising:
    receiving, by the web browser application, a request to modify data of a particular VDDF from the plurality of VDDFs; and
    modifying the particular VDDF according to the request;
    storing the modified version of the particular VDDF on the local storage of the web browser application; and
    displaying a chart based on the modified version of the particular VDDF.

4. The method of claim 1, wherein the query comprises one or more of: a filter clause, a group by clause, and an aggregation expression.

5. The method of claim 1, wherein the query joins data associated with two or more charts.

6. The method of claim 1, wherein the query identifies a data source by specifying a URL identifying a chart.

7. The method of claim 1, wherein the query identifies a data source by providing a URL identifying a markup language document and an identifier for a chart within the identified markup language document.

8. The method of claim 1, wherein the query is executed within the web browser application.

9. The method of claim 1, wherein the query joins data of a chart with data generated by a machine learning model.

10. The method of claim 1, wherein the query joins data of a chart with a distributed data frame representing data generated by an in-memory cluster computing engine.

11. A non-transitory computer readable medium storing instructions, the instructions, when executed by one or more processors, cause the one or more processors to perform steps comprising:
    receiving by a web browser application executing on the client device, one or more markup language documents transmitted from one or more first web servers, each markup language document comprising one or more charts;
    presenting, via one or more tabs of the web browser application, a plurality of charts described in the one or more markup language documents, at least one of the charts presented in a first tab of the web browser application;
    extracting data associated with the plurality of charts;
    storing in a local storage of the web browser application, visual distributed data frames (VDDFs) representing data objects representing the extracted data, each VDDF comprising the extracted data of one of the charts and metadata describing visualization of the extracted data as one of the plurality of charts, the VDDFs stored in the local storage of the web browser application accessible by a plurality of web servers in communication with the client device via different tabs of the web browser application;
    receiving, by a second web server via a second tab of the web browser application, a query for one or more of the plurality of charts, the second tab different from the first tab, the second web server different from the one or more first web servers;
    executing the received query on the VDDFs stored in the local storage of the web browser application that is accessible both the first web servers and the second web server;
    storing in the local storage of the web browser application, the result of the executed query as a VDDF; and
    sharing the stored VDDF associated with the executed query with one or more other documents configured for presentation via other web browser applications executing on other client devices.

12. The non-transitory computer readable medium of claim 11, wherein sharing the stored VDDF associated with the executed query comprises:
   exporting the stored VDDF to the second web server;
   generating a uniform resource locator (URL) for identifying the stored VDDF via the second web server;
   including the URL in a new markup language document; and
   sending the new markup language document for display via one or more web browser applications.

13. The non-transitory computer readable medium of claim 11, further storing instructions for:
   receiving, by the web browser application, a request to modify data of a particular VDDF from the plurality of VDDFs; and
   modifying the particular VDDF according to the request;
   storing the modified version of the particular VDDF on the local storage of the web browser application; and
   displaying a chart based on the modified version of the particular VDDF.

14. The non-transitory computer readable medium of claim 11, wherein the query comprises one or more of: a filter clause, a group by clause, and an aggregation expression.

15. The non-transitory computer readable medium of claim 11, wherein the query joins data associated with two or more charts.

16. The non-transitory computer readable medium of claim 11, wherein the query identifies a data source by specifying a URL identifying a chart.

17. The non-transitory computer readable medium of claim 11, wherein the query identifies a data source by providing a URL identifying a markup language document and an identifier for a chart within the identified markup language document.

18. The non-transitory computer readable medium of claim 11, wherein the query is executed within the web browser application.

19. The non-transitory computer readable medium of claim 11, wherein the query joins data of a chart with data generated by a machine learning model.

20. A computer system comprising:
   a computer processor; and
   a non-transitory computer readable medium storing instructions executed by the processor, the instructions for performing a process comprising:
      receiving by a web browser application executing on the client device, one or more markup language documents transmitted from one or more first web servers, each markup language document comprising one or more charts;
      presenting, via one or more tabs of the web browser application, a plurality of charts described in the one or more markup language documents, at least one of the charts presented in a first tab of the web browser application;
      extracting data associated with the plurality of charts;
      storing in a local storage of the web browser application, visual distributed data frames (VDDFs) representing data objects representing the extracted data, each VDDF comprising the extracted data of one of the plurality of charts and metadata describing visualization of the extracted data as one of the charts, the VDDFs stored in the local storage of the web browser application accessible by a plurality of web servers in communication with the client device via different tabs of the web browser application;
      receiving, by a second web server via a second tab of the web browser application, a query for one or more of the plurality of charts, the second tab different from the first tab, the second web server different from the one or more first web servers;
      executing the received query on the VDDFs stored in the local storage of the web browser application that is accessible both the first web servers and the second web server;
      storing in the local storage of the web browser application, the result of the executed query as a VDDF; and
      sharing the stored VDDF associated with the executed query with one or more other documents configured for presentation via other web browser applications executing on other client devices.

\* \* \* \* \*